(12) United States Patent
Flood et al.

(10) Patent No.: US 12,479,675 B1
(45) Date of Patent: Nov. 25, 2025

(54) TRAILER-INTEGRATED DRIVE-OVER SAND-TRUCK UNLOADER SYSTEM AND METHOD WITH SAFETY FEATURES

(71) Applicant: Site Prop Systems, Inc., Colorado City, TX (US)

(72) Inventors: Jeffrey D. Flood, Mayer, MN (US); Joseph G. Kreuser, Prior Lake, MN (US)

(73) Assignee: Site Prop Systems, Inc., Colorado City, TX (US)

( * ) Notice: Subject to any disclaimer, the term of this patent is extended or adjusted under 35 U.S.C. 154(b) by 0 days.

(21) Appl. No.: 19/202,711

(22) Filed: May 8, 2025

Related U.S. Application Data

(60) Provisional application No. 63/759,011, filed on Feb. 14, 2025.

(51) Int. Cl.
| | |
|---|---|
| *B65G 41/00* | (2006.01) |
| *B60R 16/03* | (2006.01) |
| *B62D 63/08* | (2006.01) |
| *B65G 41/02* | (2006.01) |
| *B65G 65/28* | (2006.01) |
| *B65G 67/24* | (2006.01) |
| *B65G 69/04* | (2006.01) |
| *B60P 1/56* | (2006.01) |

(52) U.S. Cl.
CPC .............. *B65G 67/24* (2013.01); *B60R 16/03* (2013.01); *B62D 63/08* (2013.01); *B65G 41/002* (2013.01); *B65G 65/28* (2013.01); *B65G 69/0408* (2013.01); *B60P 1/56* (2013.01); *B65G 2201/045* (2013.01)

(58) Field of Classification Search
CPC ........ B65G 41/00; B65G 41/02; B65G 65/28; B65G 67/24; B65G 69/048; B60R 16/03; B62D 63/08
USPC ....................................................... 198/311
See application file for complete search history.

(56) References Cited

U.S. PATENT DOCUMENTS

| | | |
|---|---|---|
| 3,552,546 A | 1/1971 | Rath |
| 4,135,614 A | 1/1979 | Penterman et al. |
| (Continued) | | |

*Primary Examiner* — Douglas A Hess
(74) *Attorney, Agent, or Firm* — Charles A. Lemaire; Lemaire Patent Law Firm, P.L.L.C.

(57) ABSTRACT

A self-contained multiple-trailer drive-over sand-truck unloader system and method with safety features, each trailer configured to interconnect mechanically and/or electrically and/or hydraulically to another adjacent trailer for electrical power, hydraulic power and data communications and capable of being set up into an operational configuration and reconfigured into a compact highway-travel configuration, without the need for safety harnesses. A first trailer provides the center section having an input funnel hopper for receiving bottom-dumped sand, a first conveyor for material transport to either the left or right side of the interconnected system. The system also integrates hydraulic leveling actuators on each large-area ground-contact foot with height-maintenance locks. Some embodiments include electrical and/or hydraulic mechanisms to ensure operational stability and worker safety. With pre-assembled components, OSHA-compliant safety features, and a generator-powered control system, this invention offers quick deployment and take-down, improved safety, and efficient frac-sand handling, without additional gravel deposition or clean-up.

26 Claims, 14 Drawing Sheets

(56) References Cited

U.S. PATENT DOCUMENTS

| | | |
|---|---|---|
| 5,297,914 A | 3/1994 | Ash |
| 5,515,961 A | 5/1996 | Murphy et al. |
| 5,833,043 A | 11/1998 | Schmidgall et al. |
| 7,424,943 B2 | 9/2008 | Gausman et al. |
| 9,663,303 B2 | 5/2017 | Waldner et al. |
| 9,975,712 B2 | 5/2018 | Friesen |
| 10,053,308 B2 | 8/2018 | Toews et al. |
| 10,414,319 B2 * | 9/2019 | Friesen .................. B60P 1/36 |
| 10,556,752 B1 * | 2/2020 | McCloskey ............ B65G 65/28 |
| 10,584,003 B2 * | 3/2020 | Friesen .................. B65G 47/44 |
| 10,633,174 B2 | 4/2020 | Pham et al. |
| 10,710,811 B2 | 7/2020 | Igoe |
| 10,919,704 B2 * | 2/2021 | Schmidgall ........... B65G 41/001 |
| 11,110,842 B1 * | 9/2021 | Brinkman ............. B65G 41/008 |
| 11,811,243 B2 * | 11/2023 | Luft ........................ F04B 49/08 |
| 11,975,930 B2 * | 5/2024 | Koehl .................... B65G 67/24 |
| 12,060,235 B2 | 8/2024 | Herman et al. |
| 12,312,931 B1 * | 5/2025 | Flood .................. E21B 43/2607 |

\* cited by examiner

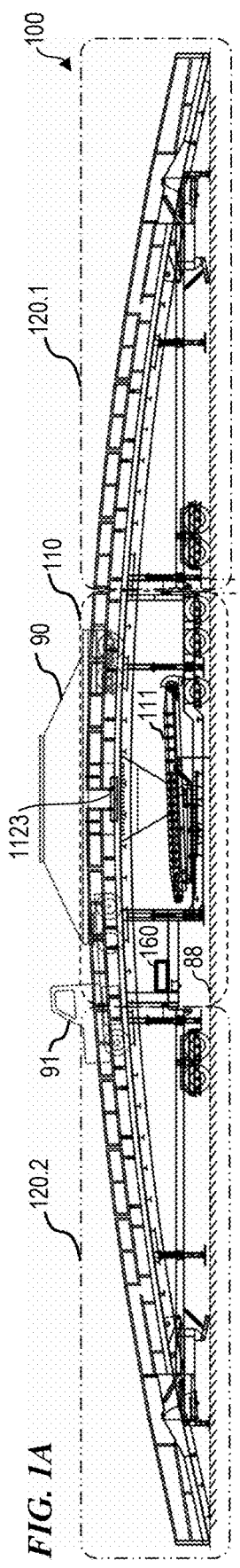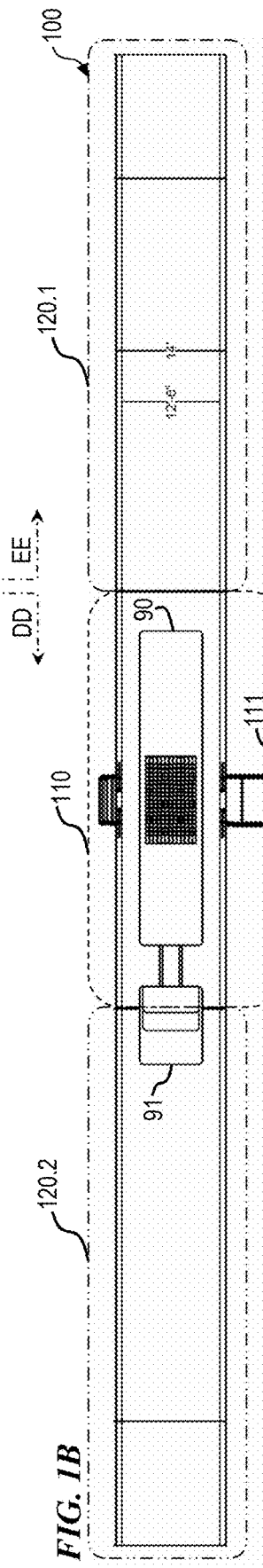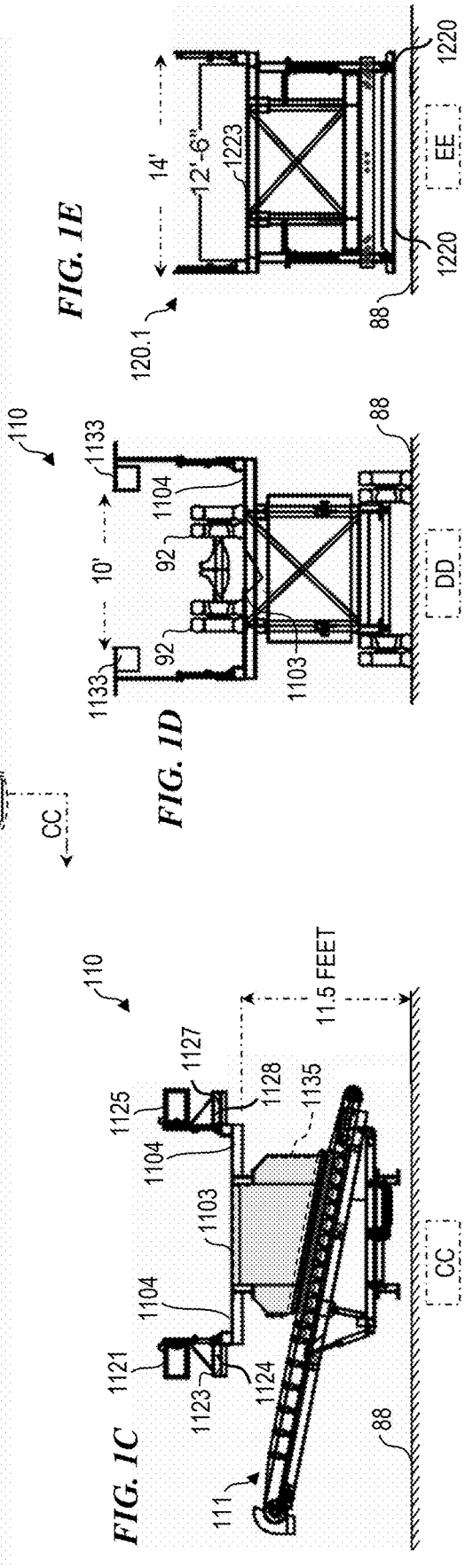

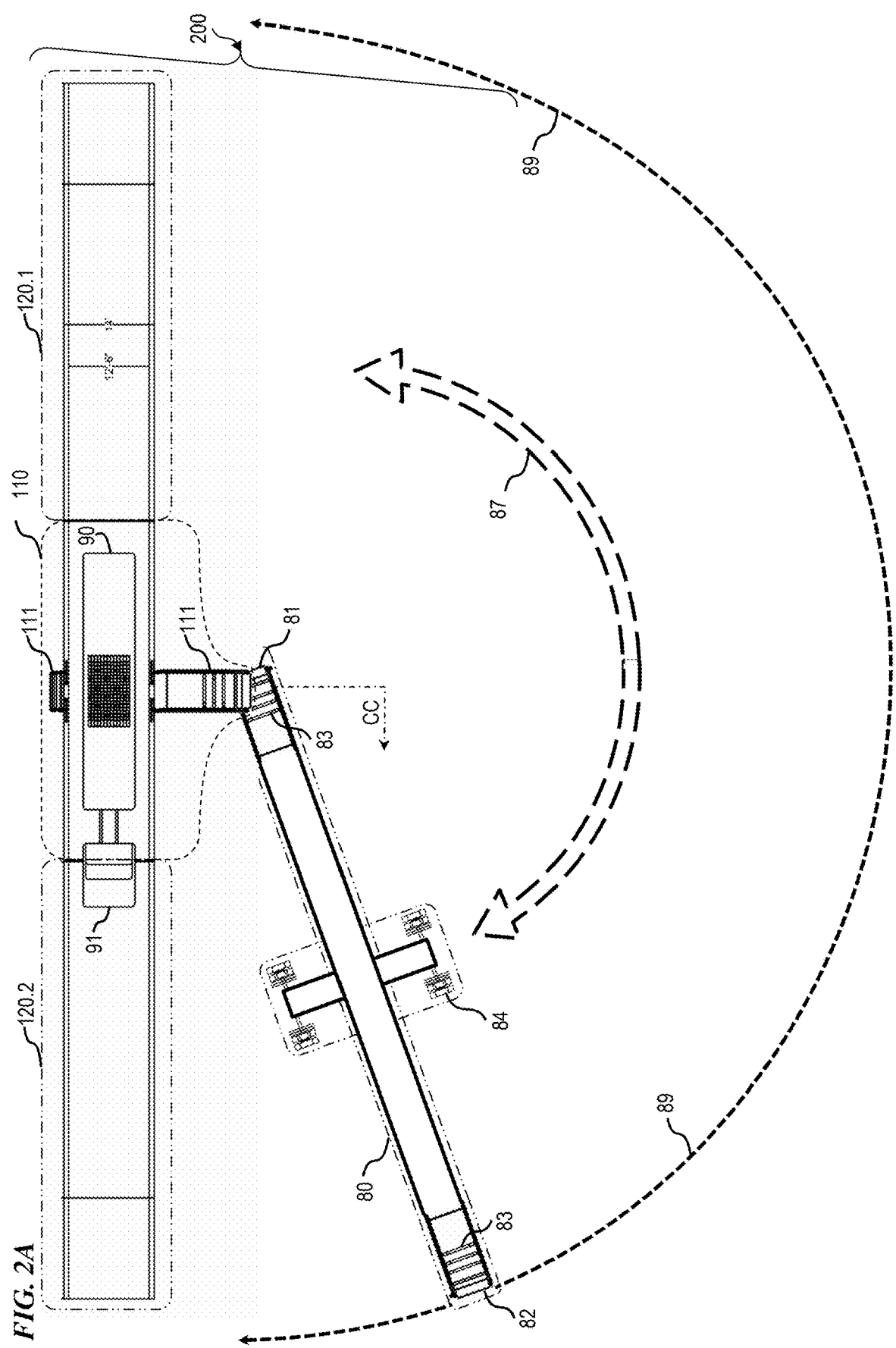

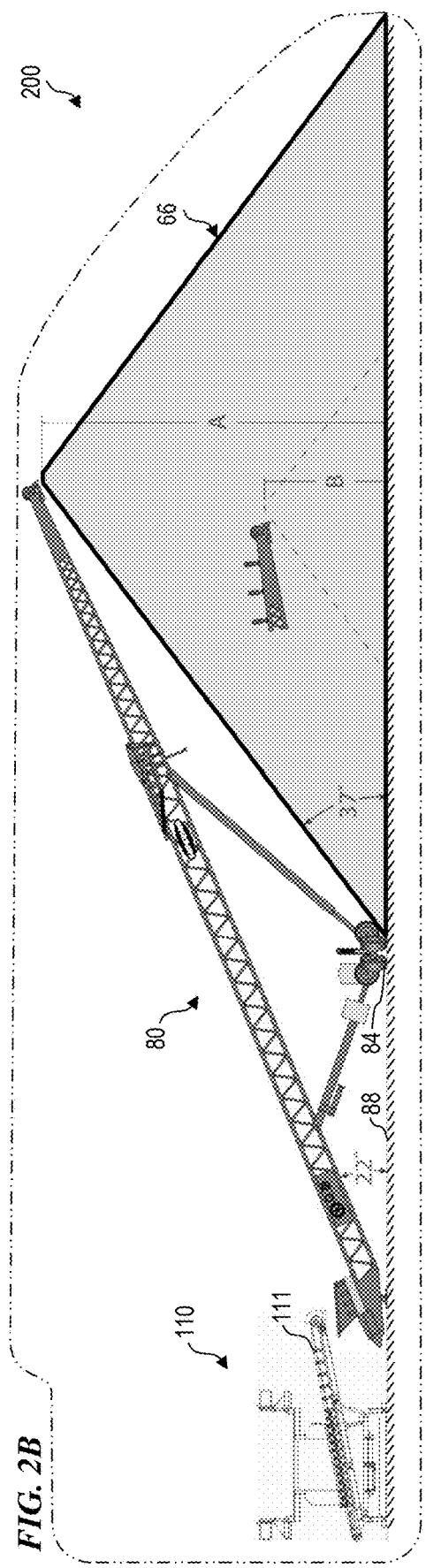

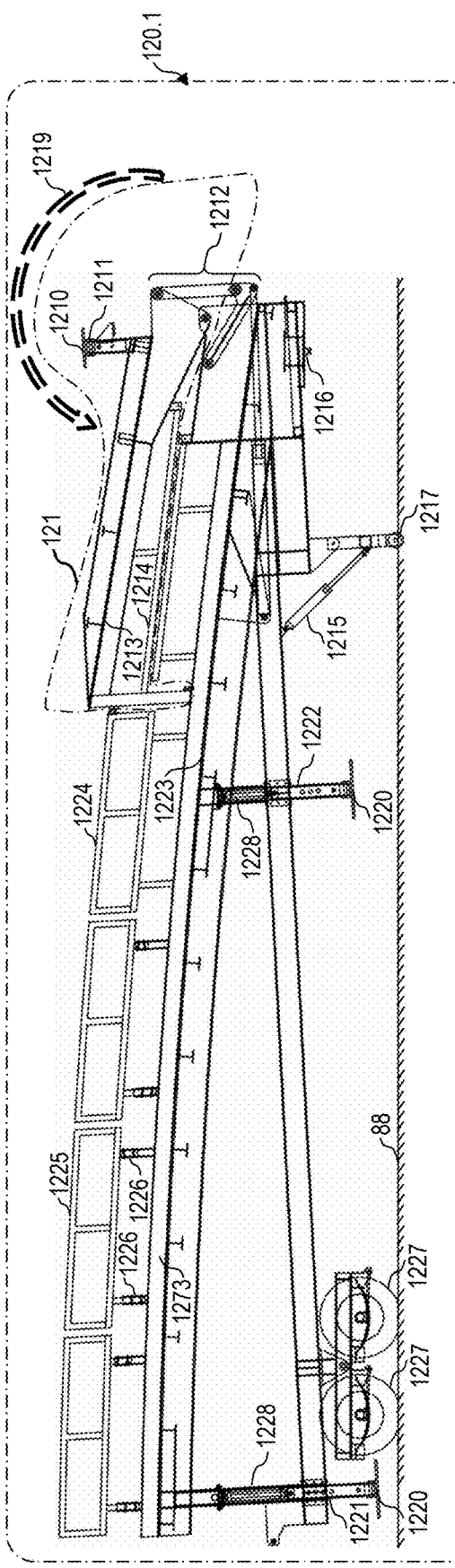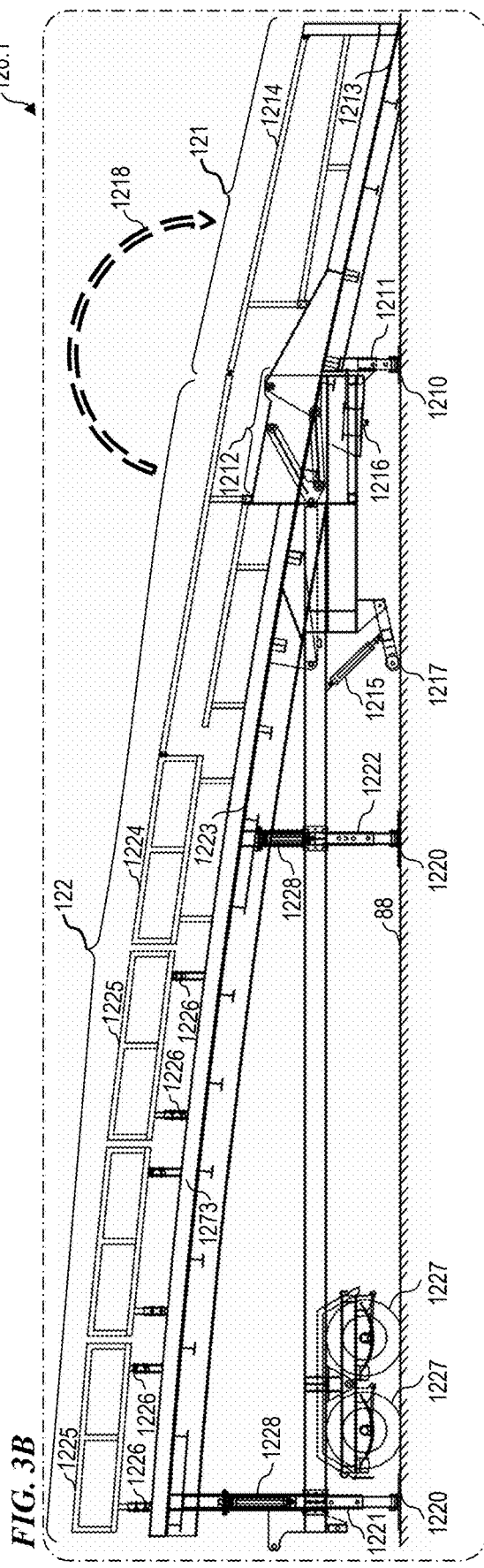
FIG. 3A
FIG. 3B

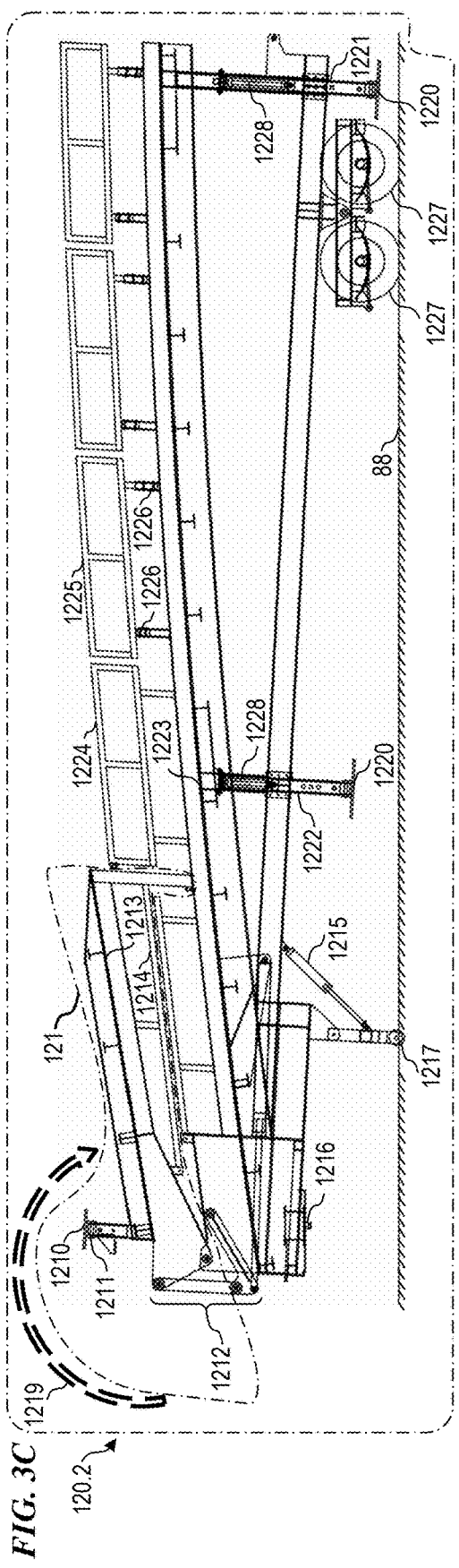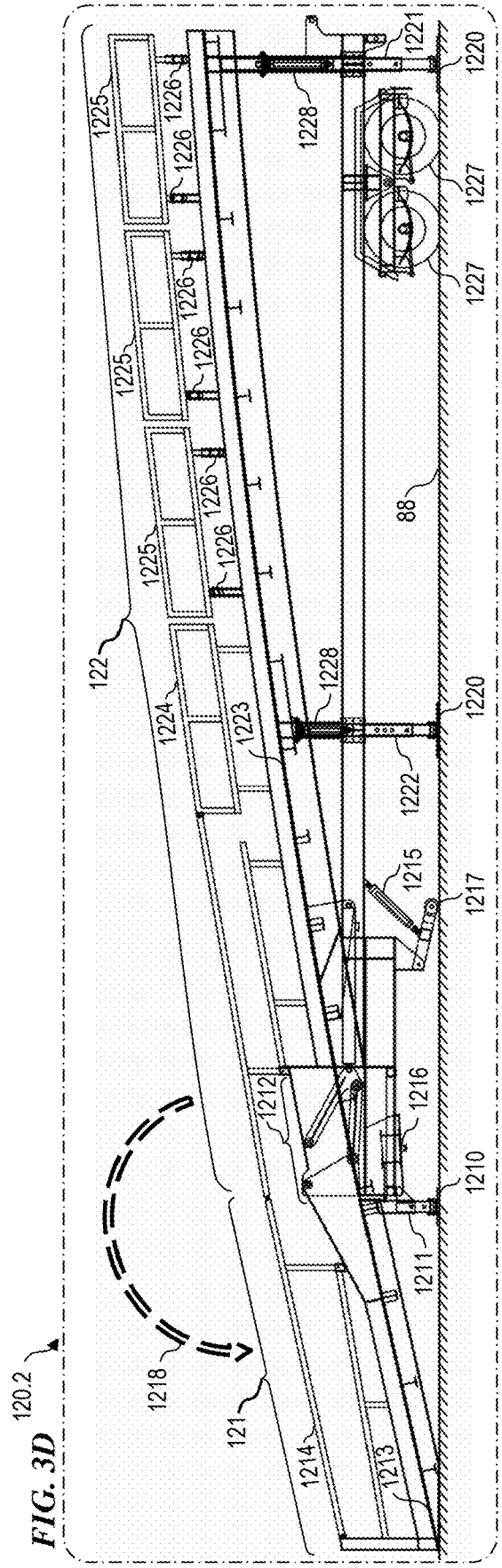

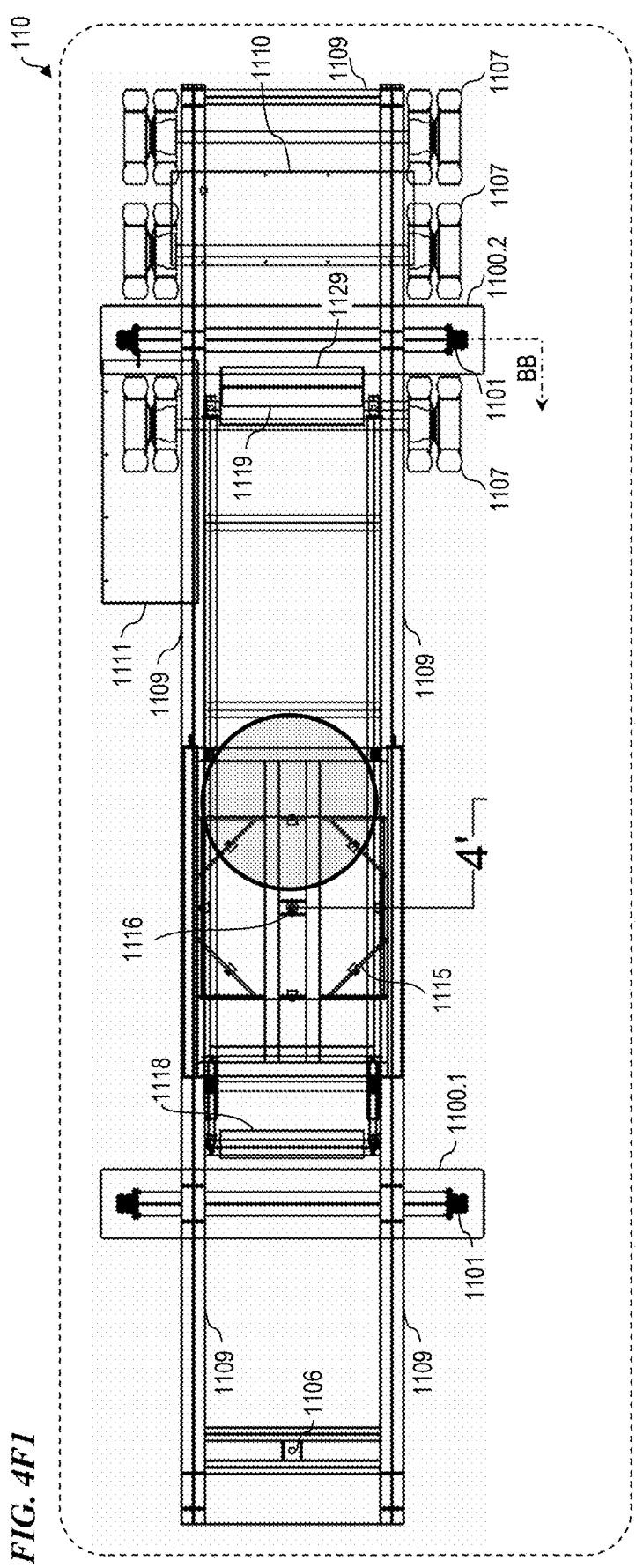
*FIG. 4F1*
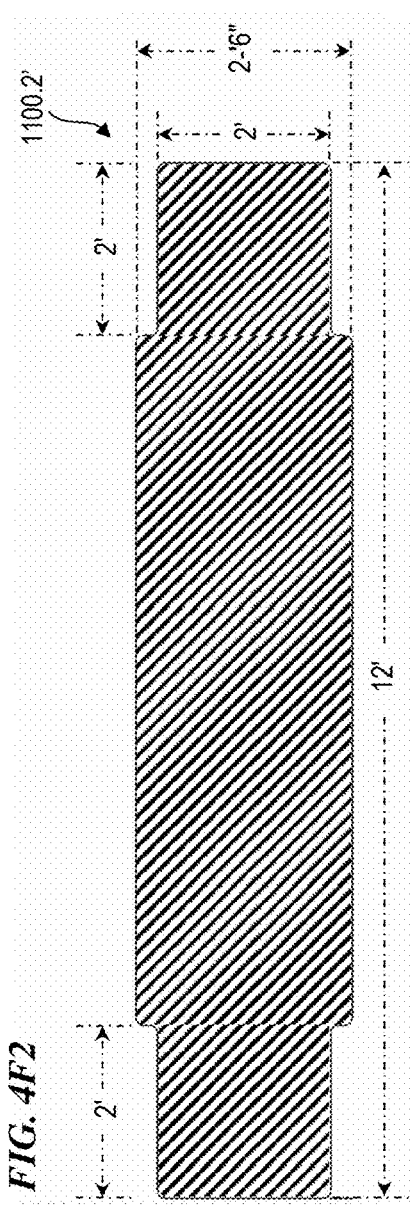
*FIG. 4F2*

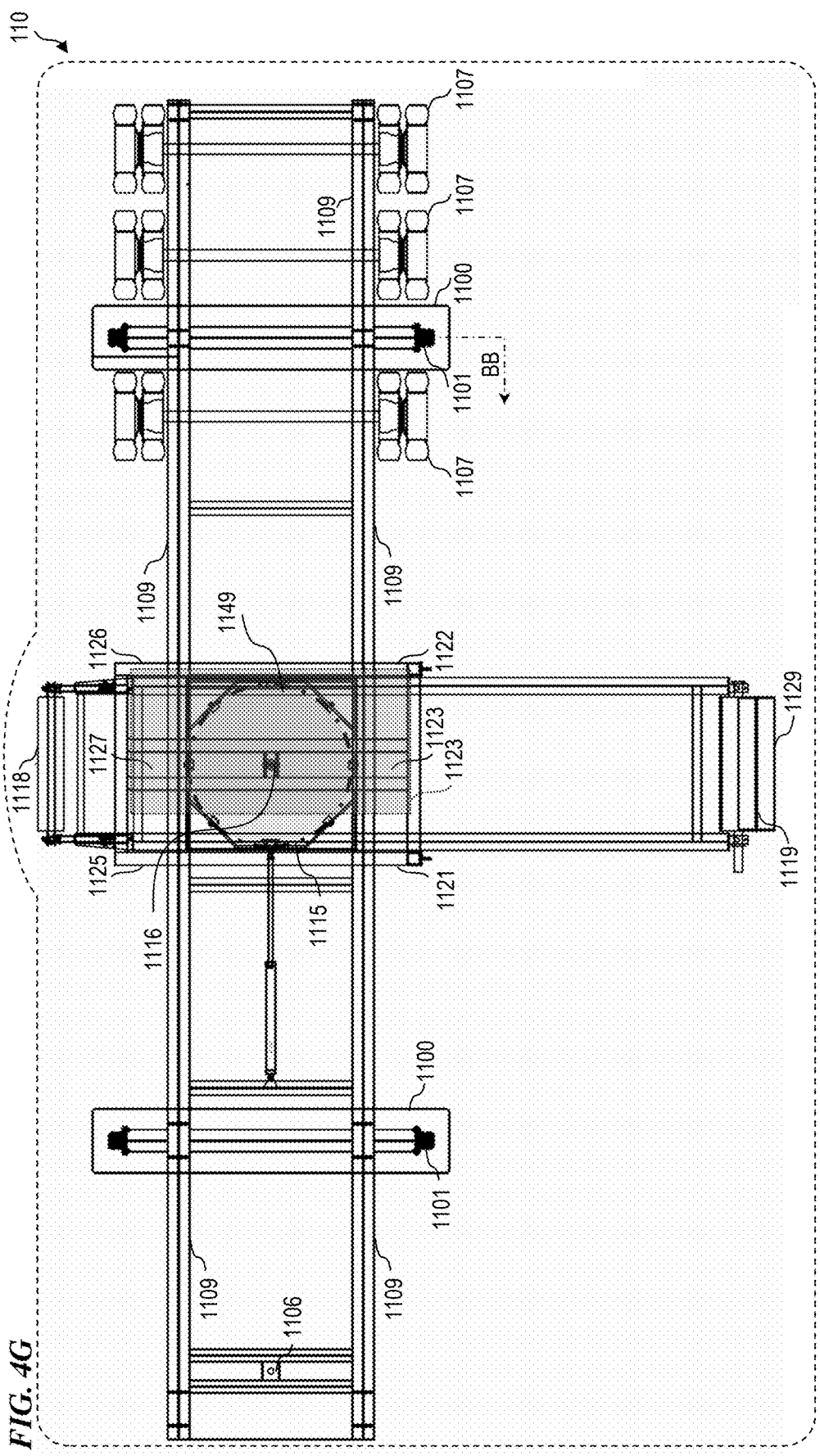

TRAILER-INTEGRATED DRIVE-OVER SAND-TRUCK UNLOADER SYSTEM AND METHOD WITH SAFETY FEATURES

CROSS-REFERENCE TO RELATED APPLICATIONS

This application claims priority benefit, including under 35 U.S.C. § 119(e), of U.S. Provisional Patent Application No. 63/759,011 filed Feb. 14, 2025 by Jeffrey D. Flood et al., titled "Trailer-integrated drive-over sand-truck unloader system and method with safety features," which is incorporated herein by reference in its entirety.

This application is related to U.S. Provisional Patent Application No. 63/738,740 filed Dec. 24, 2024 by Jeffrey D. Flood et al., titled "Trailer-mounted self-contained frac sand system and method with safety features," and to U.S. patent application Ser. No. 19/051,090 filed Feb. 11, 2025 by Jeffrey D. Flood et al., titled "Trailer-integrated self-contained frac-sand system and method with safety features" (which issued as U.S. Pat. No. 12,312,931 on May 27, 2025), which are both incorporated herein by reference in their entirety.

FIELD OF THE INVENTIONS

This invention relates to the field of oil-field equipment, and more specifically to a self-contained and self-powered trailer-integrated drive-over sand-truck unloader system and method with safety features, wherein the unloaded sand is for hydraulic fracturing (often called "fracking"). Each of the three main trailer-integrated self-powered sections is substantially pre-assembled, and the sections are mechanically and electrically connected to one another on site to form the drive-over frac-sand-truck unloader system that unloads sand from bottom-unloader sand trucks. Each of the trailer-integrated sections includes safety features such as conduit-enclosed wiring, pre-assembled fold-up railings on the drive-on and drive-off ramp sections that are connected to the two ends of the center section, thus providing truck ramps that lead to, and away from, the center section with its railings and its one or more side-extension inspection platforms. The center section has an onboard electrical generator set with optional backup generator and optional automated ground rod, conduit-enclosed wiring and illumination, hydraulic elevation cylinders and automatic height-locking system, a first sand conveyor optionally configurable for left-hand-side or right-hand-side unloading onto a conventional portable radial sand stacker having a second high-capacity belt conveyor that optionally includes a powered-wheels center support to move the second conveyor such that the far end of the second conveyor moves along an arc to deposit the sand on an arc-shaped sand pile, from which sand is scooped for transport to a nearby hydraulic-fracturing site.

BACKGROUND OF THE INVENTION

Oil-field wellsites often have unorganized collections of equipment and sand piles where it is difficult to maintain worker safety and efficiency. Labor expenses are a significant portion of operating costs. Worker safety and compliance with Occupational Safety and Health Administration (OSHA) standards are concerns. Modern oil extraction utilizes hydraulic fracturing (often called "fracking") to break underground petroleum geologic formations, such as tight shale layers, that contain oil and/or natural gas. Frac materials such as silica sand, bauxite, kaolin or other clay materials, or glass, are mixed with a liquid such as water and other chemicals to form a slurry. The slurry is pumped at high pressure into a well for the hydraulic-fracturing processes. The process requires efficient conveyors, wet sifting and handling systems for the frac materials, water, and the resulting slurry. Current systems lack versatility in loading options, integrated safety features, quick set up and knock down, and portability. Current frac-sand-handling systems are largely assembled on site from a large number of parts, with workers obtaining up to eleven semi-truck loads of equipment and supplies, which are then connected and erected using skilled and unskilled labor to connect the various mechanical, hydraulic, electrical, lighting, control and computer equipment. Climbing higher than six feet from the ground on the equipment requires safety harnesses, according to OSHA rules.

U.S. Pat. No. 3,552,546 issued to Rath on Jan. 5, 1971 with the title "Portable belt conveyor with radius movement and hydraulic telescoping and raising", and is incorporated herein by reference. U.S. Pat. No. 3,552,546 describes a very long belt conveyor is reduced to road transportable length by hydraulically telescoping both of its ends, drawing them under a section of roller way which is cammed up by them and lowered for the lowest possible center of gravity, and for lower clearance. The main frame is supported near a mid-position by two-legged hydraulic standard. A "fifth wheel" on the lower end of the main frame can be lowered by hydraulically collapsing the standard, for resting on a tractor truck. Various safety features and other details are disclosed.

U.S. Pat. No. 4,135,614 issued to Penterman et al. on Jan. 23, 1979 with the title "Portable radial stacker", and is incorporated herein by reference. U.S. Pat. No. 4,135,614 describes an axle assembly for use with a portable radial stacker (also called a "radial stacking belt-conveyor system"). The axle assembly includes a transverse member which is secured to the end of the supporting structure of the stacker proximate the ground and the member is aligned transversely to the direction of the conveyor belt. A n axle bar is secured between two pairs of tires and two torsion levers complete the assembly. One end of each torsion lever is secured to the central part of the axle bar between each pair of tires and the opposite end of each torsion lever pivotally connects one end of the transverse member. Each tire has an independent suspension mounting and at least one drive means is provided for driving at least one pair of said tires.

U.S. Pat. No. 5,297,914 issued to Ash with the title "Mobile ramp for unloading trucks", and is incorporated herein by reference. U.S. Pat. No. 5,297,914 describes an apparatus for unloading belly dump trucks into piles that includes a ramp onto which the unloading truck drives, a hopper for reception of dumped material, and a conveyor running under the hopper and onto a side conveyor arm for disposal of the material. The conveyor arm can be raised and lowered and collapsed for transport. A n engine for powering the apparatus is disposed oppositely of the conveyor arm, and can be moved toward and away from the ramp for transport and operation, respectively. Rear wheel assemblies comprise a plate slidably mounted to the side of the ramp which can raise and lower the ramp. A steerable front wheel assembly can be raised and lowered for removal of the apparatus from the towing truck and local movement of the apparatus.

U.S. Pat. No. 5,515,961 issued to Murphy et al. on May 14, 1996 with the title "Portable radial stacking conveyor", and is incorporated herein by reference. U.S. Pat. No.

5,515,961 describes a portable radial stacker having improved stability during radial travel and operation and improved highway transport characteristics. Existing material handling conveyor components may be retrofitted to embody the invention. The apparatus of U.S. Pat. No. 5,515,961 enables operators to transport portable radial stackers over public highways in most states without the requirement of using an escort because the maximum overall width in the transport configuration is 11 feet-6 inches. In addition, the width extends to more than 22 feet when configured for stacking operation and radial travel which provides greater stability than previous conveyors. Hydraulic fold-down outriggers convert the system between the transport configuration and the stacking configuration in only a few minutes which affords a great savings in time and labor. Transport wheels are equipped with air brakes and the radial travel wheels can be fitted with hydraulically actuated direct drive. Other safety features include check valves on all hydraulic cylinders, tandem axle, dual wheels on each axle configured on a walking beam. Radial movement is accomplished using underslung rocking spindle, dual flotation radial travel wheel and tire assemblies; operator controls for all hydraulic functions are provided at a single location.

U.S. Pat. No. 5,833,043 issued to Schmidgall et al. on Nov. 10, 1998 with the title "Portable radial stacking conveyer", and is incorporated herein by reference. U.S. Pat. No. 5,833,043, which is a continuation-in-part of U.S. Pat. No. 5,515,961, describes another portable radial stacker having improved stability during radial travel and operation and improved highway transport characteristics.

U.S. Pat. No. 7,424,943 issued to Gausman et al. with the title "Portable low profile drive-over truck dump conveyor system", and is incorporated herein by reference. U.S. Pat. No. 7,424,943 describes a conveyor system mounted on an elongate frame to transport material from a first end of the frame to a second, opposite end of the frame. A grate is positioned over the conveyor system and is supported by first and second sides of the frame. A ramp extends generally perpendicular to the frame on each side of the frame next to the grate to provide a drive-over access for a material transport vehicle to deposit its load over the grate and onto the conveyor system. A first end of each ramp immediately adjacent to the frame is pivotally connected to the frame to allow the frame to be articulated towards the grate. A second end of each ramp spaced from the frame is supported above but in close proximity to the ground. This patent describes that the system requires earthen and/or gravel drive-on and drive-off ramps to be added, and then later removed.

U.S. Pat. No. 9,975,712 issued to Friesen on May 22, 2018 with the title "Portable drive-over conveyor system usable for unloading belly dump trucks with multiple discharges and for simultaneously unloading more than one truck", and is incorporated herein by reference. U.S. Pat. No. 9,975,712 describes a portable drive-over conveyor with a plurality of inlets and first and second conveyors so as to be arranged for simultaneously unloading multiple trucks side by side.

U.S. Pat. No. 10,053,308 issued to Toews et al. with the title "Portable drive-over conveyor for unloading trucks", and is incorporated herein by reference. U.S. Pat. No. 10,053,308 describes a drive-over conveyor for unloading fracking sand that is designed to be towed as a highway semi-trailer includes a center frame structure containing a conveyor belt with two pivotal ramps on each side to be moved to a raised position standing upwardly and a lowered position extending outwardly. The ramps have sufficient length and the center structure has a low height to allow a highway semi-trailer to pass over a grate in the center structure. A platform is attached at the forward end with a king pin on the underside for engaging a towing platform of a highway tractor. A wheel and axle assembly including suspension of the axle for highway travel is mounted on a sub-frame pivotal relative to main rear frame for movement relative to the center frame structure from a lowered road position to a raised position allowing the center frame structure to rest on the ground.

U.S. Pat. No. 10,633,174 issued to Pham et al. on Apr. 29, 2020 with the title "Mobile oilfield material-transfer unit", and is incorporated herein by reference. U.S. Pat. No. 10,633,174 describes a mobile oilfield material transfer unit that includes a chassis having a gooseneck and support base, the support base including a first portion and second portion, and the chassis further comprising a rear axle suspension system coupled with at least two wheels for movably supporting the chassis. The mobile oilfield material transfer unit further includes an erecting mast assembly having a mast movably connected with the chassis proximate to the second portion, and an actuator system coupled with the mast and with the chassis for moving the mast between a horizontal position and a vertical position. At least two vertical conveyor assemblies may be coupled with the erecting mast and moveable between the horizontal position and the vertical position, and at least two horizontal conveyor systems may be coupled with the support frame and engageable with the at least two vertical conveyor assemblies. Each of the at least two horizontal conveyor systems may have a horizontal section with an inlet and an inclinable section with a discharge chute. Also, each of the at least two horizontal conveyor systems may be adapted to move a volume of oilfield material from the inlet to the discharge chute.

U.S. Pat. No. 10,710,811 issued to Igoe on Jul. 14, 2020 with the title "Material unloader apparatus, systems and methods", and is incorporated herein by reference. U.S. Pat. No. 10,710,811 describes a truck unloader apparatus, systems and methods for unloading and/or conveying aggregate material. In some embodiments, a load-bearing truss of the truck unloader includes a ramp in a road transport configuration.

There remains a need for a sand-unloader system that is easy, safe and quick to set up and knock down at remote locations, that includes safety features, and that quickly unloads large quantities of frac sand from bottom-dump trucks (also called belly-dump trucks).

SUMMARY OF THE INVENTION

In some embodiments, the present invention provides a trailer-integrated drive-over sand-truck unloader and conveyor system operable to be set up into an erected operational configuration with safety features at remote locations, and to be reconfigured into a lowered, compact highway-travel configuration. In some embodiments, the drive-over sand-truck unloader and conveyor system of the present invention unloads, conveys, and radially stacks any user-specified variable amount of up to at least eight-hundred (800) tons of sand per hour. This system includes three sections: a trailer-integrated center drive-over section with a first conveyor-belt section built onto a single first trailer suitable for highway travel, a trailer-integrated drive-on ramp section built onto a single second trailer suitable for highway travel, and a trailer-integrated drive-off ramp section built onto a single third trailer suitable for highway travel. Some embodiments are used with a conventional radial stacker (a second conveyor-belt section built onto a fourth trailer, used for distributing sand in a radial arc, wherein the fourth trailer is configurable for highway travel). Some embodiments are used with a conventional enclosed office structure built onto a fifth trailer that provides logistical support to workers operating the system when in its operational configuration. In some embodiments, the fourth trailer and its radial stacker and the fifth trailer and its enclosed office structure are configured to be parked in close proximity to the trailer-integrated center drive-over section and to obtain their electrical power from conduit-enclosed and/or armored wiring connected to an electrical generator set built onto the trailer-integrated center drive-over section without the required electrical cables touching the ground (wherein if the cables were on or near the ground, they would form a tripping or electrical-shock hazard when in the system is in its operational configuration). In some embodiments, onto the first trailer that forms the center-section, are mounted and pre-assembled: an input funnel hopper configured for receiving the bottom-unloaded sand from a bottom-dump sand truck; a first conveyor (which, in some embodiments, is implemented as a conveyor-belt system) configured to rotate to either the left-hand side or the right-hand side to move and deposit sand to a proximal end of a radial stacker (described more fully below) that, in some embodiments, includes second conveyor-belt section (also called simply a second conveyor); wherein the input funnel hopper optionally terminates in an optional discharge boot to control sand discharge onto the belt of the first conveyor. In some embodiments, the first conveyor extends from the funnel hopper to transfer sand onto the second conveyor-belt section, wherein the second conveyor is configured such that its proximal end remains under the distal end of the first conveyor, and its distal end is moved along a horizontal arc to transport sand that is dumped onto an arc-shaped sand pile. In some embodiments, the input funnel hopper has an internal volume that holds at least 13.5 cubic yards (about 10.33 cubic meters) of sand at one time, in order to quickly unload, into the input funnel hopper 1135, at least about half of the sand capacity of the bottom-dump sand truck (in some embodiments, a bottom-dump sand truck that holds 25 tons (about 22.6 metric tons) of sand). In some embodiments, sand is unloaded from the bottom-dump sand truck as fast as the truck is able to unload without any limitation from the truck, which may result in a sand height of up to about 8 inches (15.3 cm) above the top rim of funnel hopper 1135 (this height is the typical clearance from the bottom doors of unloader trucks) while conveyor 111 is conveying sand from, and thus emptying, funnel hopper 1135 at a rate of 13.33 tons per minute (800 tons per hour). Thus, in one minute, 13.33 tons would be emptied from funnel hopper 1135, and when a truck has fully emptied its sand into funnel hopper 1135 and is driving away, and the next truck is driving into place to start its unloading position, conveyor 111 (which operates continuously during unloading trucks and between when one truck leaves and the next truck is correctly in position to unload) will have emptied the remaining sand from funnel hopper 1135. Note that reference number 1114 refers to the belt of conveyor 111. In some embodiments, the exit opening of input funnel hopper 1135 is sized, shaped and angled to allow and limit the rate of sand leaving the input funnel hopper onto the first conveyor to about the rate that the first conveyor can move sand to the second conveyor-belt section (in some embodiments, up to about twenty-five (25) tons (22.6 metric tonnes) per minute, which is about 1,500 tons (1,356 metric tonnes) per hour).

In some embodiments, the second conveyor-belt section can transfer only eight-hundred (800) tons per hour, so the rate transferred by the first conveyor is reduced to match the rate capacity of the second conveyor by adjusting the (constant) speed of the first conveyor and/or limiting the height of sand leaving the input funnel hopper onto the first conveyor. In some embodiments, the safety features include: the trailer-integrated drive-on ramp section having its leading end, and drive-off ramp section having its trailing end, flush at ground level, with walkways extending from ground level to the elevated level of the center section with handrails for the entire length, conduit-enclosed wiring, optional lighting, and broad and long leveling feet that are lowered and raised using hydraulic cylinders. Some embodiments further include a self-contained electrical alternator/generator set, having a primary alternator/generator and, optionally, a backup electrical alternator/generator, for powering the system. In some embodiments, the self-contained electrical alternator/generator set is mounted onto one or more of the trailers, preferably the trailer-integrated center drive-over section. Some embodiments further include manually controlled and/or automated leveling actuators and railing-position-maintenance locks for erection rigging of the system by a person located on ground level, eliminating the need for workers to climb on equipment and use safety harnesses. In some embodiments, a plurality of sensors distributed to relevant locations on the system provide data communicated to a computer-controller data subsystem that controls and/or collects data regarding geographical locations, hours of operation, various operational parameters of the system such as amounts of sand unloaded, identification of the trucks and personnel, amount of fuel remaining for operation of the electrical generators, whether all safety features are activated and/or locked, and other relevant system data.

The entire system includes OSHA-compliant safety features, such as safety railings, walkways and/or stairways, an integrated electrical generator set and electrically powered hydraulic pumps and actuators, and optional nighttime lighting. Each of the trailer-integrated sections has conduit-enclosed electrical conductors preinstalled on each trailer, with short armored electrical connections between trailers to minimize the work needed to get the entire electrical system up and running and to avoid electrical cables lying on the ground. In some embodiments, each of the trailer-integrated sections has one or more electrically powered hydraulic pumps and a hydraulic-actuator subsystem. In some embodiments, substantially all structural components are metallic and the three primary trailers—the drive-on ramp section, the center section, and the drive-off ramp section—are electrically grounded to each other. In some alternative embodiments, the system utilizes fixed-speed screw-auger conveyors in place of, or in addition to, belt conveyors for transferring the sand. In some embodiments, all electrical conductors of each trailer are pre-wired and enclosed in metal conduit, eliminating the need for on-site electricians or electrical connections to receive power from external power sources. In some embodiments, all erection rigging employs automated, semi-automated and/or manual hydraulic and/or electrical actuators and elevation locks, removing the need for workers to climb onto the equipment during erection or take down of the system, or use safety harnesses during setup, take down, or operational use of the system.

BRIEF DESCRIPTION OF THE DRAWINGS

FIG. 1A is a side elevation view of a trailer-integrated drive-over sand-truck unloader system 100 in its erected, nearly operational configuration, but before the leveling cylinders have lowered the stabilization feet, according to some embodiments of the present invention.

FIG. 1B is a top (plan) view of a trailer-integrated drive-over sand-truck unloader system 100 in its erected, operational configuration with first conveyor 111 rotated to the left-hand side (relative to the highway-travel configuration) of center section 110, according to some embodiments of the present invention.

FIG. 1C is a cross-section elevation view, along section line CC of FIG. 1B, of trailer-integrated drive-over sand-truck unloader system 100 in the erected operational configuration with first conveyor 111 rotated to the left-hand side, according to some embodiments of the present invention.

FIG. 1D is a cross-section elevation view, along section line DD of FIG. 1A, of trailer-integrated drive-over sand-truck unloader system 100 in the erected operational configuration, according to some embodiments of the present invention.

FIG. 1E is a cross-section elevation view, along section line EE of FIG. 1A, of trailer-integrated drive-over sand-truck unloader system 100 in the erected operational configuration, according to some embodiments of the present invention.

FIG. 2A is a top (plan) view of a drive-over sand-truck unloader system 200, which includes trailer-integrated system 100 in its erected, operational configuration, and an associated conventional radial stacker conveyor system 80 showing travel path 87 of the wheel platform 84 of radial stacker conveyor system 80, according to some embodiments of the present invention.

FIG. 2B is an elevation view of sand-pile formation system 200, including a cross-section view, along section line CC of FIG. 1B and FIG. 2A, of center section 110 of trailer-integrated drive-over sand-truck unloader system 100, and a side elevation view of a conventional radial stacker 80, that together form a trailer-integrated sand-pile formation system 200, according to some embodiments of the present invention. FIG. 2B shows system 100 in its erected, operational configuration, and the associated conventional radial stacker conveyor system 80.

FIG. 3A is a side elevation view of a trailer-integrated drive-on ramp 120.1 of sand-truck unloader system 100 in its folded, nearly ready for highway-travel configuration, according to some embodiments of the present invention.

FIG. 3B is a side elevation view of trailer-integrated drive-on ramp 120.1 of sand-truck unloader system 100 in its unfolded operational configuration, according to some embodiments of the present invention.

FIG. 3C is a side elevation view of a trailer-integrated drive-off ramp 120.2 of sand-truck unloader system 100 in its folded, nearly ready for highway-travel configuration, according to some embodiments of the present invention.

FIG. 3D is a side elevation view of trailer-integrated drive-off ramp 120.2 of sand-truck unloader system 100 in its unfolded operational configuration, according to some embodiments of the present invention.

FIG. 4F1 is a top (plan) view of trailer-integrated center section 110 of sand-truck unloader system 100 in its leveled configuration, before its first conveyor 111 has been rotated to its perpendicular operational configuration in the travel configuration, according to some embodiments of the present invention.

FIG. 4F2 is a top (plan) view of an alternative foot 1100.2' used in some embodiments of sand-truck unloader system 100.

FIG. 4G is a top (plan) view of trailer-integrated center section 110 of sand-truck unloader system 100 in its leveled configuration, after its first conveyor 111 has been rotated to its left-side perpendicular operational configuration, according to some embodiments of the present invention.

DETAILED DESCRIPTION OF THE INVENTION

Figure 3E:
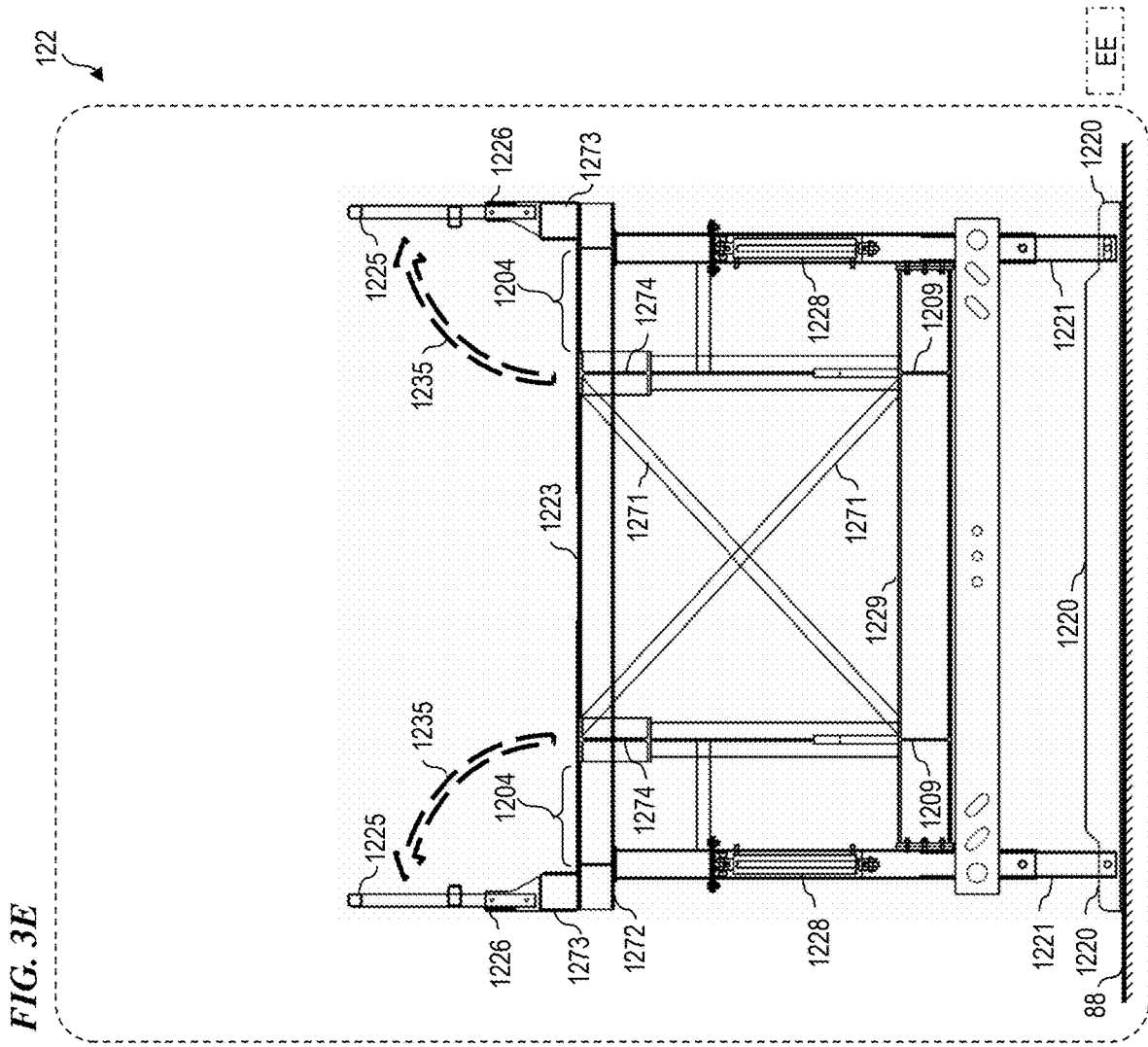
FIG. 3E is a cross-section end-elevation view, along section line EE of FIG. 1A, of drive-off main ramp portion 122 of trailer-integrated drive-over sand-truck unloader system 100, in the erected operational configuration, according to some embodiments of the present invention.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As used herein, the term "trailer-integrated" means that all required parts of each of the three main portions of the apparatus (trailer-integrated drive-on ramp 120.1, trailer-integrated drive-over center section 110, and trailer-integrated drive-off ramp 120.2; see FIG. 1A) are permanently or substantially permanently mounted on a respective trailer frame. Each respective trailer frame includes axles and wheels that remain assembled as integral parts of each respective trailer both when each is in its highway-travel configuration, as well as when in its operational drive-over bottom-dump sand-unloader configuration. This integration increases safety by reducing or eliminating errors in setup and knock down of the system, and ensures that all needed parts are available and assembled when system 100 arrives and leaves the job site. This integration also speeds the set up and knock down of system 100. The term "trailer-mounted" is sometimes used with a similar meaning, but can also, in other instances, refer to a different system that is transported on multiple trailers, but then moved off the trailer and the parts assembled on site for its operational use, with such a system not being integrated with the trailers.

In some embodiments, all metallic components are electrically connected and grounded for worker safety and to prevent static electricity build-up and reduce the risk of fire or explosion.

In some embodiments, all set-up rigging (including, e.g., walkway handrails) is operated via manual or automated hydraulic actuators, all of which are configured to be operated by a worker on ground level or remotely, eliminating the need for workers to climb onto system 100, or wear safety harnesses or manually handle rigging during set up or take down of system 100.

Figure 4A:
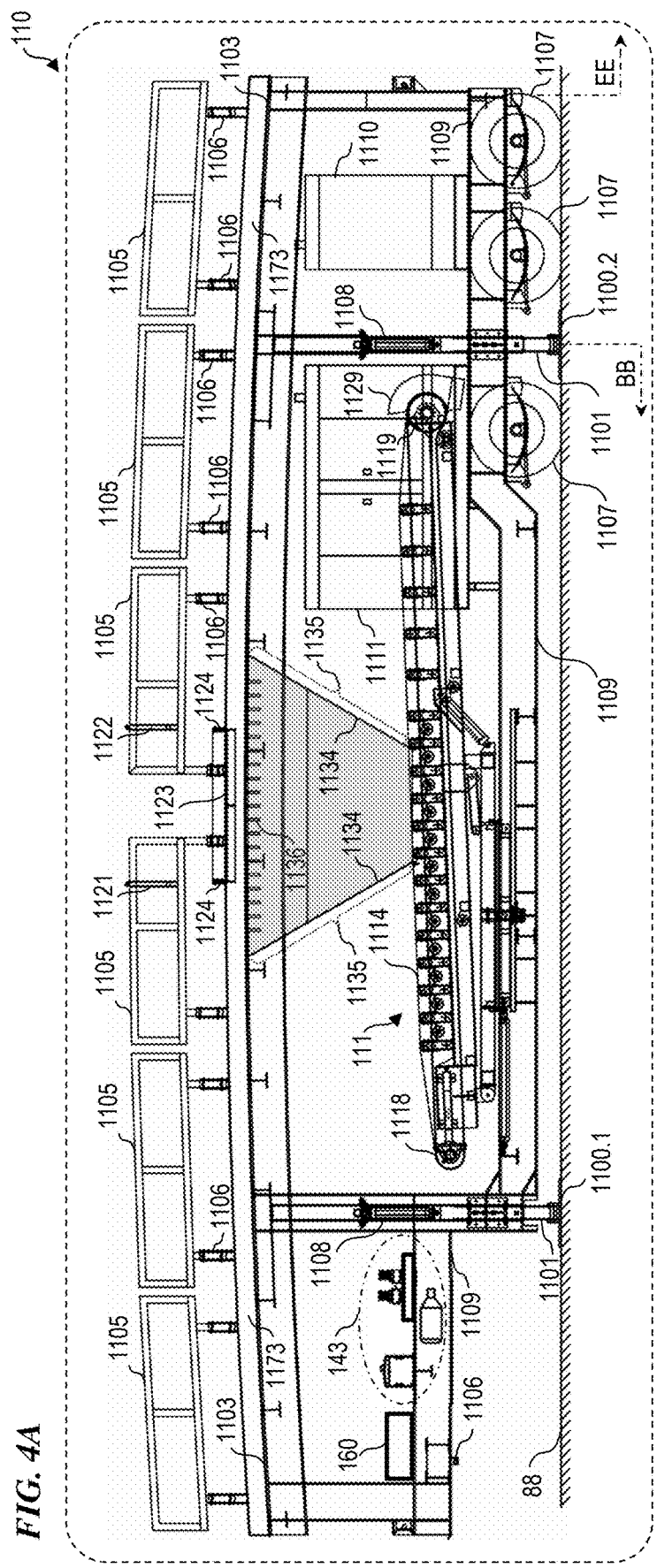
FIG. 4A is a side elevation view of a trailer-integrated center section 110 of sand-truck unloader system 100 in its leveled configuration before its first conveyor 111 has been rotated to its perpendicular operational configuration, according to some embodiments of the present invention.

Integration and portability: In some embodiments, the entire drive-over sand-truck unloader system 100 is integrated on three trailers: trailer-integrated drive-on ramp 120.1, trailer-integrated drive-over center section 110, and trailer-integrated drive-off ramp 120.2, making system 100 suitable for highway travel, as well as eliminating the need for workers to connect a plurality of subsystems delivered on separate vehicles (reducing labor costs and minimizing safety concerns). As shown in FIG. 4A, an electrical generator set 1110 and optional backup electrical generator set 1111, and hydraulic system 143 are mounted on the trailer 110 to provide power for the conveyor belts, lighting, and auxiliary systems, ensuring safe operability in remote locations. In some embodiments, a plurality of sensors distributed to relevant locations on system 100 provide data communicated to a computer-controller data subsystem 160 that controls operations and/or collects relevant system data. In some embodiments, electrical connections, hydraulic and/or data-communications connections are provided at each end of the trailer-integrated drive-over center section 110 for connection to provide electricity, pressurized hydraulic power and/or two-way data communications to corresponding receiver connections on trailer-integrated drive-on ramp 120.1 and trailer-integrated drive-off ramp 120.2.

Material Construction: In some embodiments, all major mechanical parts that provide structural strength are constructed from a durable metal, such as steel, stainless steel, and/or aluminum to ensure worker safety, electrical grounding, structural longevity and reliability. In some embodiments, all electrical conductors are pre-wired and enclosed in metal conduit or armored cables, eliminating the need for off-trailer on-site electrical sources, or externally sourced electrical or hydraulic power or electricians.

FIG. 1A is a side elevation view of a trailer-integrated drive-over sand-truck unloader system 100 in its erected, nearly operational configuration, according to some embodiments of the present invention. In some embodiments, drive-over sand-truck unloader system 100 includes three main, largely self-contained sections: drive-on ramp section 120.1, drive-over center section 110, and drive-off ramp section 120.2, each built on a highway-capable trailer. In some embodiments, drive-on ramp section 120.1 and drive-off ramp section 120.2 are identical (and so each may be referred to as ramp section 120) and are interchangeable in use—i.e., either can be connected to either end of drive-over center section 110 as the "on ramp" for truck 91 and its bottom-dump trailer 90. Note that the entire truck 91 and its bottom-dump trailer 90 are entirely positioned on, and fully supported by, unloader system 100 during the unloading operation. Similarly, in some embodiments, drive-over center section 110 is configurable to receive dump trucks traveling front-to-back or back-to-front relative to drive-over center section 110. FIG. 1A shows drive-on ramp section 120.1, drive-over center section 110, and drive-off ramp section 120.2 connected to each other, parked on ground surface 88, but before the leveling cylinders are activated to lower the leveling feet (described below) to ground level 88 (which would be required before truck 91 and its bottom-dump trailer 90 would be permitted to drive onto system 100). Note that truck 91 and its bottom-dump trailer 90 are shown on system 100 as if it were fully set up, but FIG. 1A shows system 100 before the leveling cylinders and feet are lowered and before first conveyor 111 is rotated to its perpendicular operational position (as is shown in FIG. 1B). In some embodiments, a plurality of sensors distributed to relevant locations on system 100 (such as sensors associated with each of the latching hinges on each of the movable railings to ensure all railings are properly deployed and latched for personnel safety, sensors associated with each of the hydraulic cylinders and latch pins for each leveling/stabilizing foot, and the like), and these sensors provide data communicated to computer-controller data subsystem 160 that controls operations and/or collects relevant system data. Section line "DD" shows the location of end-section view of FIG. 1D, and Section line "EE" shows the location of end-section view of FIG. 1E.

Some embodiments further include a left-side maintenance/inspection platform 1123, including (see FIG. 1C) railings 1121 and kickboards 1124 for worker/inspector safety, that surround left-side maintenance/inspection platform 1123 on three sides.

FIG. 1B is a top (plan) view of a trailer-integrated drive-over sand-truck unloader system 100 in its erected, operational configuration, with first conveyor 111 rotated to the left-hand side, according to some embodiments of the present invention. In some embodiments, conveyor 111 is configured (to get to its operational configuration) to only rotate (swing the direction of) its output end to approximately 90 degrees (or other suitable angle) to just one side (in the embodiment shown, only to the left side (the driver's side) of drive-over center-section trailer 110) (in some embodiments, this is due to the sloped bottom shape of funnel hopper 1135). In those embodiments that only swing conveyor 111 to just one side of drive-over center section 110, if it is desired to deposit sand on the other side, then trailer 110 is simply parked longitudinally facing the opposite direction. Since, in some embodiments, the drive-on ramp section 120.1 and drive-off ramp section 120.2 are identical, they are backed up to each end of drive-over center-section trailer 110 after it is positioned (parked) in the desired orientation, allowing the conventional radial stacker second conveyor 80 (see FIG. 2A and FIG. 2B) to be positioned on the left or right side of system 100 to distribute the unloaded frac sand in an arc extending around either the left or right side of drive-over sand-truck unloader system 100 (depending on the parked orientation of the center section 110). In some other embodiments, first conveyor 111 is designed with dual-side accessibility (i.e., wherein first conveyor 111 can be rotated, either 90 degrees to the left or 90 degrees to the right, to output sand to either the left or right side of drive-over center section trailer 110), and funnel hopper 1135 is also configured such that its bottom edge slopes to conform to the position and orientation of first conveyor 111. Either of these embodiments allows the unloaded frac sand to be deposited in an arc on either the left or right side or on both sides of the original parking location, with minimal reparking maneuvers.

FIG. 1C is a cross-section elevation view, along section CC of FIG. 1B, of drive-over center section 110 of trailer-integrated drive-over sand-truck unloader system 100 in the erected operational configuration with first conveyor 111 rotated to the left-hand side, according to some embodiments of the present invention. Left-side platform railings 1121 and kickboards 1124 surround left-side maintenance/inspection platform 1123 on three sides for worker/inspector safety. Some embodiments further include a right-side maintenance/inspection platform 1127, including railings 1125 and kickboards 1128 that surround right-side maintenance/inspection platform 1127 on three sides for worker safety. In some embodiments (not shown here), a set of tire-guiding pipes (not shown here) are installed on the left and right side of truck support surface 1103, and a treaded walkway is provided between the tire-guiding pipes and the outer safety handrails (fences) 1214 (on the flip-over portion of the drive-on/drive/off ramps), handrails 1224 (fixed upright handrails that need not fold down for highway travel), and foldable handrails 1225 (handrails that fold down for the highway-travel state, or fold up and lock in their upright position for their operational state—see FIG. 3A) of drive-on ramp section 120.1 and drive-off ramp section 120.2, and outer safety fences 1105 (see FIG. 4A) of drive-over center section 110. A spotter or inspection person thus uses the walkways to walk from ground level 88 from either ground-level end of drive-on ramp section 120.1 or drive-off ramp section 120.2 to the left-side maintenance/inspection platform 1123 or right-side maintenance/inspection platform 1127 of drive-over center section 110, with a good level of protection against being accidentally hit or runover by trucks driving onto or off drive-over sand-truck unloader system 100.

In some embodiments, funnel hopper 1135 extends from its upper edge at the drive surface 1103 downward to the conveyor 111, and has an angled bottom edge that conforms in shape to the angled conveyor 111 (in its operational position) on all four sides, such that sand does not fall out except onto conveyor 111. In some embodiments, funnel hopper 1135 has a sufficient internal volume (e.g., in some embodiments, about 365 cubic feet (about 13.5 cubic yards, which is about 10.34 cubic meters—enough to hold 17.5 to 21.6 tons of sand (about 16.5 to 20.6 metric tonnes), depending on how wet the sand is) and conveyor 111 has a rate of sand removal of up to about 25 tons per minute (about 1,500 tons per hour), such that an entire truck-load of about twenty-five (25) tons can be unloaded into (and if needed, slightly above the top of) funnel 1135 in about one minute. Since the bottom clearance of the unloading doors 83 (see FIG. 4B) of bottom-unloader dump trucks 90 is about eight inches (about 20 cm) or slightly more, that much additional sand can be deposited above the top of funnel hopper 1135 and it will be moved down into funnel 1135 after the truck departs, and moved by conveyor 111 before the next truck is in place to unload its sand. For embodiments that have a rate limitation of moving sand by a second conveyor of eight-hundred (800) tons per hour, about thirty-two (32) bottom-unloader dump trucks, each hauling twenty-five (25) tons of sand, can be unloaded per hour by system 100 or by combined trailer-integrated drive-over sand-truck unloader system 200, which includes system 100 in its erected, operational configuration, and an associated radial stacker conveyor-belt system 80 (see FIG. 2A and FIG. 2B below).

In some embodiments, the clearance from ground level 88 to the bottom of the truck unload position on drive surface 1103 of drive-over center section 110 is eleven feet six inches (about 3.5 meters), which provides ample clearance for conveyor 111 relative to scattered sand that accumulates on the ground 88 due to various conditions such as unloaded sand falling off the sides of conveyor 111 or sticking to the bottom of the returning continuous belt 1114 and dropping as belt 1114 returns around lower-end roller 1118 (see FIG. 4A).

The clearance above ground level provided by the drive-over sand-truck unloader system 100 of the present invention, along with the temporary buffer storage of unloaded sand deposited in (and sometimes above the top of) input funnel hopper 1135, solves a major problem of conventional approaches, namely, the lack of sufficient ground clearance to avoid conveyor-belt jamming when unloading the large quantities of frac sand needed for modern hydraulic-fracturing operations, which may cause frequent work stoppage to clear sand from around the conveyor belts when using conventional drive-over unloaders such as those described in U.S. Pat. Nos. 5,297,914, 7,424,943, 9,975,712, 10,053,308, and 10,633,174 listed in the Background section above. Various conventional systems, such as described in U.S. Pat. No. 7,424,943, require earthen or crushed-rock ramps that add extra cost and time to set up, can present safety issues if not properly set up and continually inspected and maintained during extensive truck-unloading operations, and later present ramp-gravel removal and clean-up issues when removing the unloader and cleaning the wellsite.

FIG. 1D is a cross-section elevation end view, along section DD of FIG. 1A, of drive-over center section 110 of trailer-integrated drive-over sand-truck unloader system 100 in the erected operational configuration according to some embodiments of the present invention. In some embodiments, drive surface 1103 of drive-over center section 110 has spaced-apart steel traction bars welded on the surface 1103 perpendicular to the direction of travel of truck tires 92. In some embodiments, spring-loaded swing-away guidance flags 1133 provide centering information for the person driving truck 91 and bottom-dump trailer 90 (the upper portions of which are not shown in FIG. 1D). In some embodiments, a walkway 1104 is provided along the outer portion of drive surface 1103 outside of the traction bars.

FIG. 1E is a cross-section elevation view, along section EE of FIG. 1A, of ramp section 120.1 of trailer-integrated drive-over sand-truck unloader system 100 in the highway-travel configuration along section EE of FIG. 1A, according to some embodiments of the present invention. When in the highway-travel configuration, leveling foot 1220 is raised off the ground 88. In some embodiments, the drive surface 1223 has a side-to-side clearance of twelve feet six inches (3.81 meters) and an outside width of fourteen feet (4.26 meters). In some embodiments, each leveling foot 1220 is fourteen feet (4.26 meters) end-to-end, passing underneath system 100 from one side to the other, and about two foot six inches (about 0.75 meters) wide, so as to avoid the need for supplemental surface blocking (wooden boards or steel plates) that otherwise might be needed to prevent the leveling feet from sinking into the earth. In some other embodiments, each leveling foot 1220 is twelve feet (3.66 meters) end-to-end, and about two foot six inches (about 0.75 meters) wide, with ends that are sufficiently narrowed (e.g., by three inches (7.5 cm) on each side-see FIG. 4F2) to fit between the rear sets of tires between which the ends of leveling foot 1220 pass as they are lowered or raised.

FIG. 2A is a top (plan) view of a trailer-integrated drive-over sand-truck unloader system 200, which includes system 100 in its erected, operational configuration, and an associated radial stacker conveyor-belt system 80, showing travel path 87 of its wheel platform 84, according to some embodiments of the present invention. In some embodiments, radial stacker conveyor-belt system 80 is a conventional radial-stacker stockpile conveyor-belt system, such as a Pinnacle® Conveyor model available from Superior Industries (info@superior-ind.com; headquartered in Morris Minnesota 56267, U.S.A.), with modifications including a powered four-wheel-drive wheel platform 84 that allows the proximal receiving end of radial stacker conveyor-belt system 80 to remain at the location to receive sand from the first conveyor 111 while moving the distal end along a circular arc 89. In some embodiments, the powered endless conveyor belt 83 goes from a proximal roller 81 to a distal roller 82, to deposit the unloaded sand along the top of a circular arc 89 of up to about 180 degrees. In some embodiments, radial stacker conveyor-belt system 80 is about 100 feet long.

FIG. 2B is an elevation view of sand-pile formation system 200, including a cross-section view, along section line CC of FIG. 1B and FIG. 2A, of center section 110 of trailer-integrated drive-over sand-truck unloader system 100 and a side elevation view of a conventional radial stacker 80 that together form a trailer-integrated sand-pile formation system 200, according to some embodiments of the present invention. FIG. 2B shows system 100 in its erected, operational configuration, and the associated conventional radial stacker conveyor system 80 (image credit to Superior Industries; info@superior-ind.com) that together form a trailer-integrated drive-over sand-truck unloader and sand-pile formation system 200. In some embodiments, the angle of the conveyor of radial stacker 80 (shown here with a 22-degree angle relative to ground 88 level) is adjusted to a shallower angle when depositing sand on a shorter pile (e.g., pile cross-section shape for height "B") to help reduce the amount of blown sand that occurs when dropping from a higher height, and then the conveyor angle gradually increases as the sand pile 66 reaches height "A", wherein here the angle of the sand pile 66 is assumed to be 37 degrees.

FIG. 3A is a side elevation view of a trailer-integrated drive-on ramp 120.1 of sand-truck unloader system 100 in its folded, nearly ready for highway-travel configuration, according to some embodiments of the present invention. In some embodiments, drive-on ramp 120.1 and drive-off ramp 120.2 are essentially identical assemblies, and either can be used interchangeably connected to either end of drive-over center section 110. In some embodiments, each of four hydraulic cylinders 1228 is operably connected to a respective one of four movable pillars 1221 or 1222 to lower or raise each leveling foot 1220. In some embodiments, each leveling foot 1220 is about is fourteen feet (4.26 meters) end-to-end, and about one foot six inches (about 0.5 meters) wide, so as to be large enough in area to avoid the need for supplemental surface blocking that otherwise might be needed to be shipped to the wellsite and manually placed on the ground 88 to prevent the leveling feet 1220 from sinking into the earth. In some embodiments, the flip-over end ramp portion 121 includes two fixed pillars 1211 connected to a third leveling foot 1210, a drive surface 1213 and safety railings 1214, and a hydraulic-powered lever-arm assembly 1212 that is activated to rotate in arc direction 1218 to fold flip-over end ramp portion 121, relative to main ramp portion 122, to its highway-travel position shown in FIG. 3A. In some embodiments, hydraulic cylinder 1215 is operable to lower parking wheel 1217 to prepare trailer-integrated drive-on ramp 120.1 for connection to a semi-truck tractor using kingpin 1216 (a steel pin located on the underside of the front end of the trailer-integrated drive-on ramp 120.1), wherein kingpin 1216 fits into the fifth-wheel coupling on the tractor, which locks around the kingpin 1216 to secure the trailer to the tractor for towing to and from a well site. Kingpin 1216 serves as the pivot point for the trailer 120.1 when the tractor turns. Parking wheel 1217 is lowered when trailer-integrated drive-on ramp 120.1 is prepared for connection to or removal from the semi-tractor truck(s) (not shown) used for towing system 100 between job sites. In some embodiments, trailer-integrated drive-on ramp 120.1 includes foldable safety handrails (railings) 1225 that fold down for highway travel (to reduce the height when traveling), or fold up and lock (i.e., latch) for operational use as hand rails and safety restraints, using latching hinge assemblies 1226. In some embodiments, each of the railings 1225 and latching hinge assemblies 1226 is operable to be raised and lowered (unfolded and folded) by a person standing on ground level as a safety feature. In some embodiments, sensors are associated with each latching hinge assembly 1226 that provide data communicated to computer-controller data system 160 (see FIG. 1A and FIG. 4A).

FIG. 3B is a side elevation view of trailer-integrated drive-on ramp 120.1 of sand-truck unloader system 100 in its unfolded operational configuration, according to some embodiments of the present invention. In some embodiments, hinge assembly 1212 is operated with one or more hydraulic cylinders to fold down flip-over end ramp portion 121 from over main ramp portion 122 so its back end rests on the ground 88, and foot 1210 with its pillar 1211 also supports the end ramp portion 121. In some embodiments, hydraulic cylinder 1215 is operable to raise parking wheel 1217 out of the way to prepare trailer-integrated drive-on ramp 120.1 for operational use. In some embodiments, respective ones of four cylinders 1228 push down respective ones of four pillars 1221 or 1222 so that the two feet 1220 are pressed against the ground 88, and then locking pins are inserted through pillars 1221 to remove the weight load from cylinders 1228 during operational use. In some embodiments, square beams 1273 with nine-inch cross-section widths and heights are welded along the entire length of both outer edges of ramp surface 1223 and also serve as kick plates for the safety of persons walking on walkways 1204 along the sides of ramp surface 1223 (see FIG. 3E).

FIG. 3C is a side elevation view of a trailer-integrated drive-off ramp 120.2 of sand-truck unloader system 100 in its folded, nearly ready (except for folding down handrails 1225) for highway-travel configuration, according to some embodiments of the present invention. The various parts and reference numbers in FIG. 3C are described above for FIG. 3A, since, in some embodiments, drive-off ramp 120.2 is substantially identical to drive-on ramp 120.1.

FIG. 3D is a side elevation view of trailer-integrated drive-off ramp 120.2 of sand-truck unloader system 100 in its unfolded operational configuration, according to some embodiments of the present invention. The various parts and reference numbers in FIG. 3D are described above for FIG. 3B, since, in some embodiments, drive-off ramp 120.2 is substantially identical to drive-on ramp 120.1.

Figure 4B:
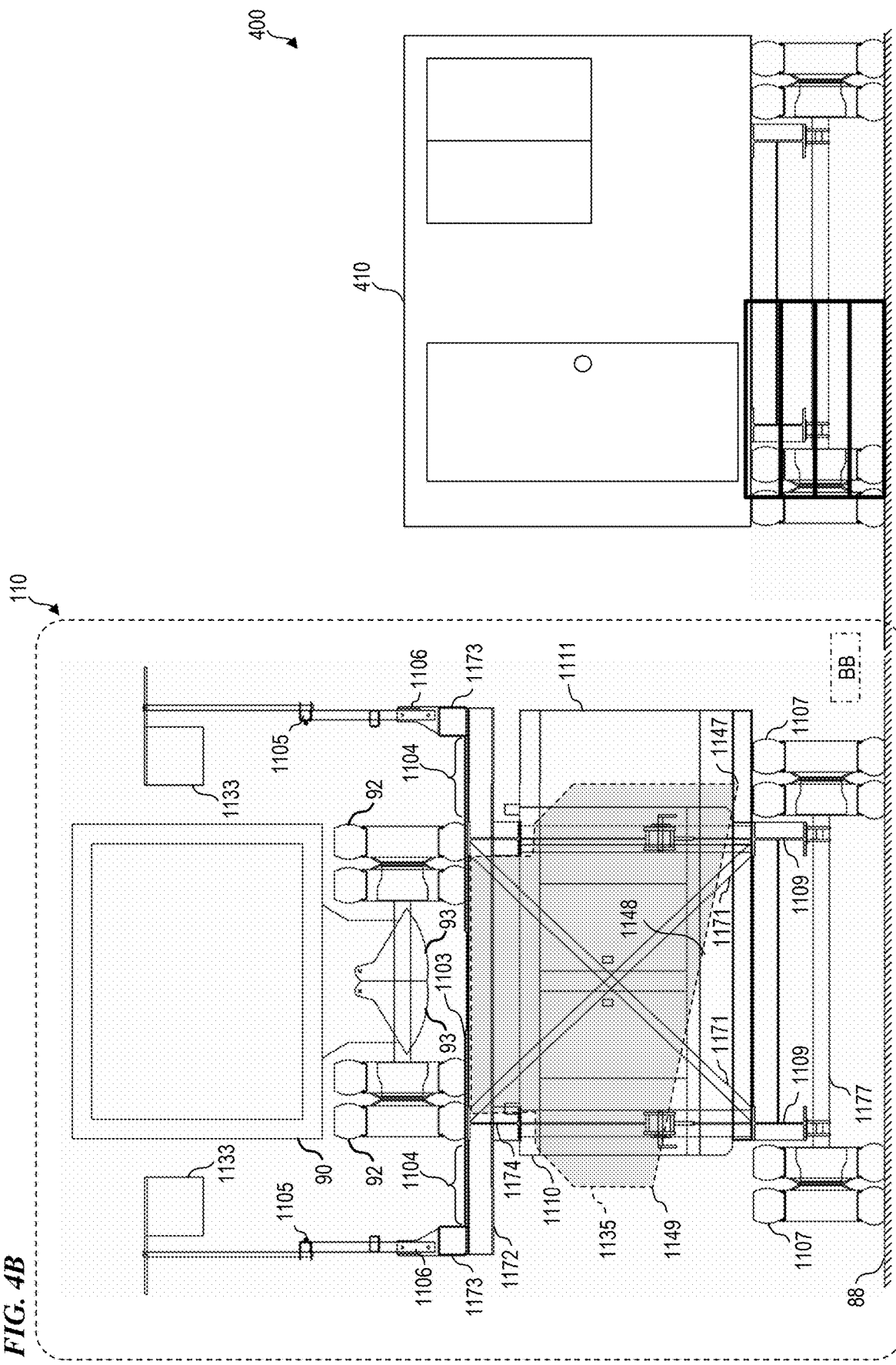
FIG. 4B is a cross-section elevation view, along section lines BB of FIG. 4A and FIG. 4F1, of trailer-integrated drive-over sand-truck unloader system 100 in the erected operational configuration, according to some embodiments of the present invention.

FIG. 3E is a cross-section elevation view of main ramp portion 122 of trailer-integrated drive-on ramp 120.1 of trailer-integrated drive-over sand-truck unloader system 100, in the erected operational configuration along section EE of FIG. 1A, according to some embodiments of the present invention. In some embodiments, the erected operational configuration is obtained by extending leveling pillars 1221 downward using hydraulic cylinders 1228 so that foot 1220 is firmly pressing against the earth ground 88, and in some such embodiments, a locking pin is inserted through each of the leveling pillars 1221 for safety to remove the weight load from hydraulic cylinders 1228 during operational use. In some embodiments, cross braces 1271 extend from lower-frame length-wise I-beams 1209 and perpendicular I-beams 1229 to upper-frame length-wise I-beams 1274 and perpendicular beams 1272. In some embodiments, upper-frame length-wise box beams 1273 (e.g., in some embodiments, nine-inch cross-section square steel beams) provide a kickplate safety function for the walkways 1204 that are provided along both sides of the outer portion of drive surface 1223, along the entire length of drive-over unloader system 100. In some embodiments, lowerable (foldable) safety handrails 1225 are erected by rotation around hinges 1226 in the 1235 direction and affixed in their upright position using latching (locking) pins (or equivalent mechanisms) that remain non-removable parts of trailer-integrated drive-on ramp 120.1 so that workers do not need to search for and find such parts to set up system 100. In some embodiments, centering flags, such as flags 1133 shown in FIG. 4B, are affixed to some or all of lowerable safety handrails 1225.

Figure 3F:
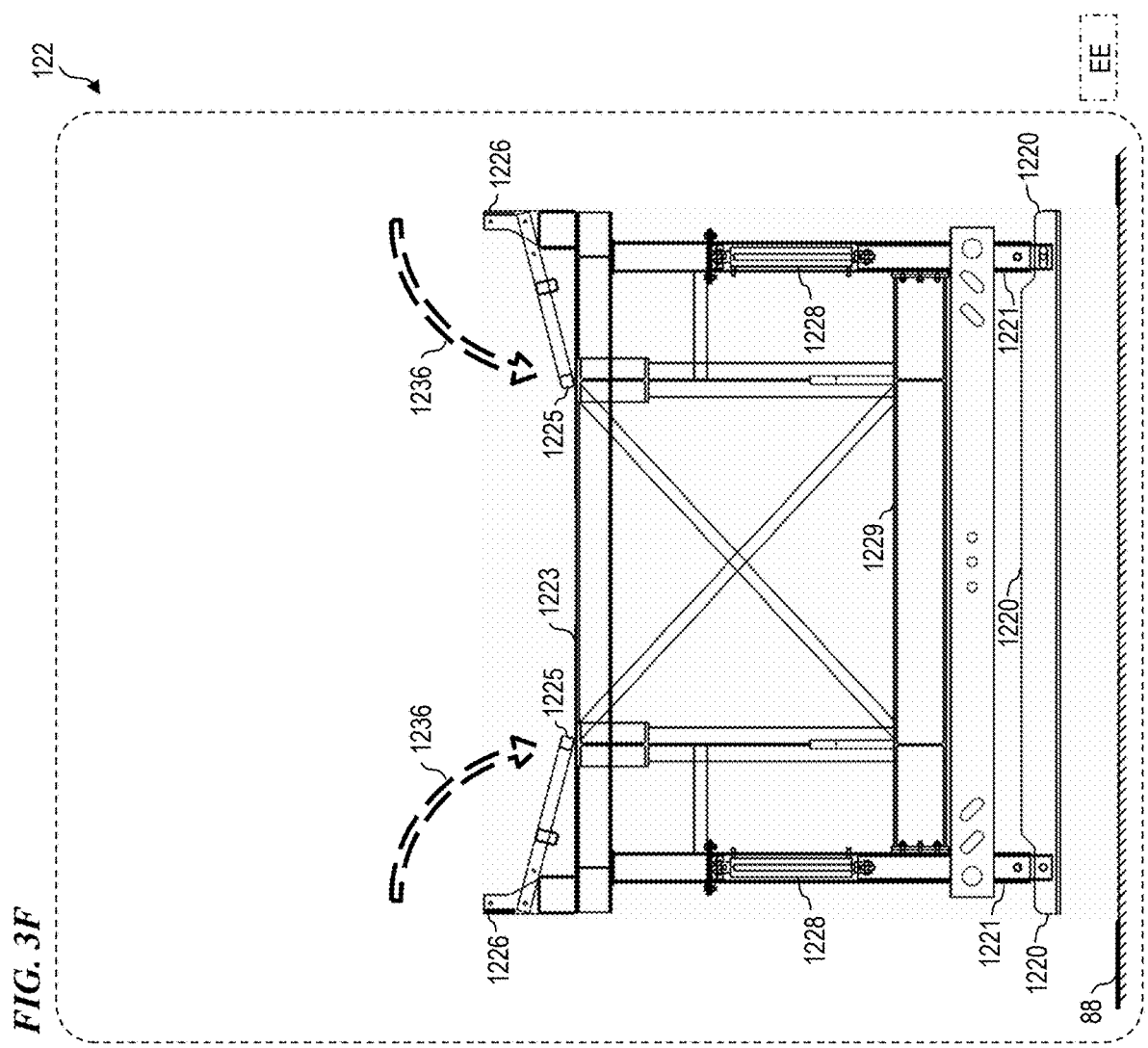
FIG. 3F is a cross-section end-elevation view, along section line EE of FIG. 1A, of drive-off main ramp portion 122 of trailer-integrated drive-over sand-truck unloader system 100 in the de-erected highway-travel configuration, according to some embodiments of the present invention.

FIG. 3F is a cross-section elevation view of main ramp portion 122 of trailer-integrated drive-on ramp 120.1 of trailer-integrated drive-over sand-truck unloader system 100 in the de-erected highway-travel configuration along section PP of FIG. 1A, according to some embodiments of the present invention. In some embodiments, the highway-travel configuration is obtained, once the trailer section is attached to a semi-truck tractor for travel, by retracting leveling pillars 1221 upward using hydraulic cylinders 1228 so that foot 1220 is raised away from the earth ground 88, and in some such embodiments a locking (latching) pin is withdrawn from each of the leveling pillars 1221, once the weight load is removed by a slight movement of hydraulic cylinders 1228, and after the locking pin is removed, the hydraulic cylinders are further activated to raise foot 1220. In some embodiments, lowerable (foldable) safety handrails 1225 are lowered by rotation around hinges 1226 in the 1236 direction after disengaging locking pins (or equivalent mechanisms) that remain non-removable parts of trailer-integrated drive-on ramp 120.1 so that workers do not need to search for and find such parts to later again set up system 100.

FIG. 4A is a side elevation view of a trailer-integrated drive-over center section 110 of sand-truck unloader system 100 in its leveled operational configuration (i.e., with both front foot 1100.1 and rear foot 1100.2 lowered to the level of ground 88 by extending each of four cylinders 1108 to press down each of four leg posts 1101) before its first conveyor 111 has been rotated to its perpendicular operational configuration, according to some embodiments of the present invention. In some embodiments, an electrical generator set 1110 and optional backup electrical generator set 1111, and hydraulic system 143 are mounted on the trailer 110 to provide electrical and/or hydraulic power for the conveyor belts, safety illumination lighting, data collection, storage and transmission, and auxiliary systems, ensuring safe operability of system 100 in remote locations. In some embodiments, electrical generator set 1110 and optional backup electrical generator set 1111 provide electrical power not only to devices installed on drive-over center-section trailer 110, but also to devices on trailer-integrated drive-on ramp 120.1 and drive-off ramp 120.2, and optionally to motor(s) on radial stacker conveyor-belt system 80 (see FIG. 2A and FIG. 2B) via electrical conductors that are pre-wired and enclosed in metal conduit and/or armored cables, eliminating the need for off-trailer on-site electrical sources, or externally sourced electrical or electricians. In some embodiments, hydraulic system 143 includes one or more tanks for hydraulic oil, one or more hydraulic pumps powered by electricity from the electrical generator set 1110 and/or optional backup electrical generator set 1111, as well as control valves that are manually controlled and/or automatically by computer-controller-data subsystem 160. In some embodiments, a plurality of sensors and/or data-input devices distributed to relevant locations on the system 100 provide data communicated to computer-controller data subsystem 160 that controls and/or collects and reports data regarding geographical locations, hours of operation, various operational parameters of the system such as amounts of sand unloaded, identification of trucks and which personnel were involved in operations, amount of fuel remaining for operation of the electrical generators, whether all safety features are activated and/or locked, and other relevant system data.

In some embodiments, respective ones of four hydraulic cylinders 1108 push down respective ones of four pillars 1101 so that each levelling foot 1100 (in some embodiments, a front-end leveling foot 1100.1 and a back-end leveling foot 1100.2) is pressed against the ground 88, and then locking pins are inserted through pillars 1101 to remove the weight load from hydraulic cylinders 1108 during operational use. In some embodiments, nine-inch square beams 1173 along the entire length of both outer edges of ramp surface 1103 also serve as kick plates for the safety of persons walking along the sides of ramp surface 1103 (see also FIG. 4B). Kingpin 1106 fits into the fifth-wheel coupling on a semi-tractor truck (not shown, this truck is used for highway travel to successive jobs at separated wellsites), wherein the fifth-wheel coupling locks around the kingpin 1216 to secure the drive-over center-section trailer 110 to the tractor. Kingpin 1216 serves as the pivot point for the drive-over center-section trailer 110 when the tractor turns. In some embodiments, a plurality of safety fence (railing) sections 1105 fold up using hinge assemblies 1106 to position them in their operational configuration, or railing sections 1105 fold down using hinge assemblies 1106 to position them in their lowered highway-travel configuration. In some embodiments, twelve wheels 1107 are used to support the load on frame 1109. In some embodiments, an electrical alternator 1110 is used to generate electricity used to control and power the motor(s) driving conveyor belt 1114 of conveyor 111, as well as those motor(s) on radial stacker conveyor-belt system 80 (see FIG. 2A and FIG. 2B). In some embodiments, a fold-down inspection/observation platform 1123 is provided for a person acting as a spotter and load counter, and is surrounded by a kickplate 1124 and fold-out safety railings 1121 and 1122. In some embodiments, a coarse screen or set of parallel bars (a "grizzly gate") 1136 prevents large rocks or other objects from falling through to funnel hopper 1135 as sand drops down from the unloading bottom-dump trailer 90 and onto conveyor belt 1114. In the Figures, the cross-section of funnel hopper 1135 is shaded to more clearly indicate its location and shape. In some embodiments, conveyor belt 1114 is an "endless" continuous conveyor belt traveling around proximal end roller 1118 and a distal end roller 1119, which is covered by diverter shell 1129 that helps ensure the sand drops as desired onto the proximal end of radial stacker 80 (see FIG. 2A and FIG. 2B). In some embodiments, conveyor 111 includes one or more weight sensors that weigh the conveyed sand as the sand is being loaded to radial stacker 80. Section line BB shows the location of the cross-section view of FIG. 4B.

FIG. 4B is a cross-section elevation view of trailer-integrated center section 110 of drive-over sand-truck unloader system 100 in the erected operational configuration along section BB of FIG. 1B, according to some embodiments of the present invention. A lso shown here is a conventional enclosed office structure 410 integrated onto a fifth trailer 400, which supplements system 100 of FIG. 1A and FIG. 1B, or system 200 of FIG. 2A and FIG. 2B, wherein the office structure 410 includes equipment powered by electrical power from the electrical generator set 1110 to provide logistical support to workers operating the system when in the system is in its operational configuration. In some embodiments, a plurality of axle assemblies 1177, each having a plurality of wheels 1107, are affixed to trailer frame 1109. One or more self-contained electrical alternator sets 1110 and/or 1111 are mounted to lower-frame lengthwise I-beams 1109. Cross braces 1171 extend from lower-frame length-wise I-beams 1109 to upper-frame length-wise I-beams 1174 and perpendicular beams 1172. In some embodiments, upper-frame length-wise box beams 1173 (e.g., in some embodiments, nine-inch cross-section square steel beams) provide a kickplate safety function for the walkways 1104 that are provided along both sides of the outer portion of drive surface 1103, along the entire length of drive-over unloader system 100. In some embodiments, spring-loaded swing away guidance flags 1133 provide centering guidance for the person driving truck 91 (not shown in this cross section) and bottom-dump trailer 90 to keep its tires 92 centered between beams 1173. In some embodiments, a walkway 1104 is provided along both sides of the outer portion of drive surface 1103 outside of the traction bars that are affixed to the truck-tire driving portion of drive surface 1103. An opening in the center portion of drive surface 1103 allows sand to drop through into funnel hopper 1135 when the swing-open bottom doors 93 of trailer 90 are opened. In some embodiments, railings 1105 with their centering flags 1133 on each side of trailer-integrated center section 110 are folded down centerward via hinge assemblies 1106 when adjusting trailer-integrated center section 110 to its highway-travel configuration. Conversely, railings 1105 with their centering flags 1133 on each side of trailer-integrated center section 110 are folded up and outward via hinge assemblies 1106 when adjusting trailer-integrated center section 110 to its unloading operational configuration.

In some embodiments, the sloped sides 1134 of funnel hopper 1135 extend at its top rim from the drive surface 1103 of drive-over center section 110 down to its bottom rim 1148 at the moving side edges of the belt 1114 on conveyor 111, and to the belt surface at the lower end 1147 and upper sand-exit end 1149 of funnel hopper 1135. In some embodiments, the bottom rim 1148 is formed of a rubber or rubber-like elastomer material bolted or riveted to bottom edges 1146 of the metal portion of funnel hopper 1135 (see FIG. 4C).

Figure 4C:
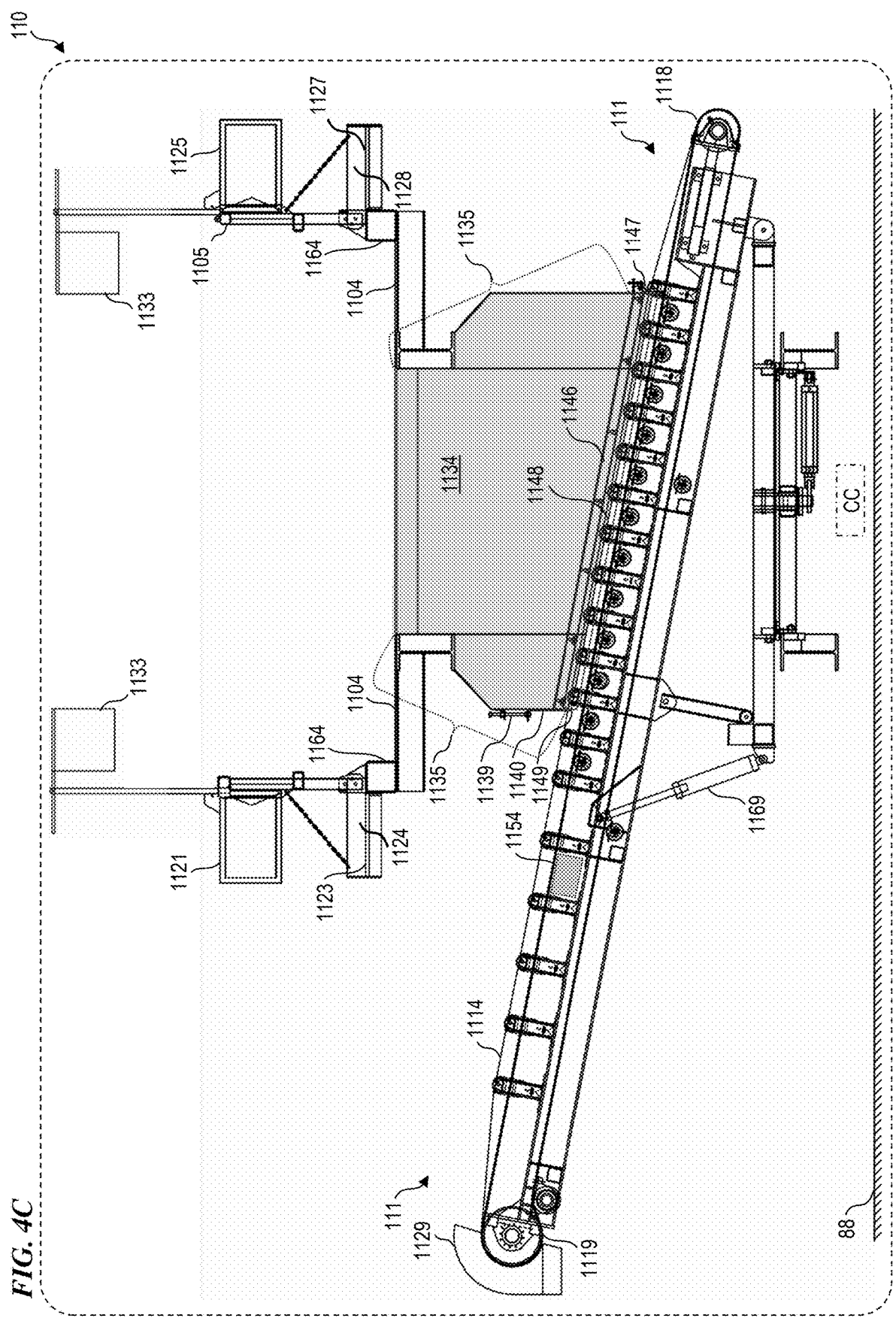
FIG. 4C is a cross-section elevation view, along section lines CC of FIG. 1B and FIG. 2A, of trailer-integrated drive-over sand-truck unloader system 100 in the erected operational configuration in the operational configuration, according to some embodiments of the present invention.

FIG. 4C is a cross-section elevation view, along section lines CC of FIG. 1B and FIG. 2A, of drive-over center section 110 in the erected operational configuration, according to some embodiments of the present invention. In some embodiments, conveyor 111 is moved to its operational orientation that is perpendicular to trailer frame 1109 (see top view of FIG. 4G) from its highway-travel orientation that is parallel to trailer frame 1109 (see top view of FIG. 4F1). In some embodiments, conveyor 111 is then erected, from its 2.25-degree (nearly horizontal) highway-travel orientation, to its operational angled configuration having an angle of about 11 degrees from horizontal ground 88 by cylinder 1169. In some embodiments, funnel hopper 1135 has sloped bottom edges 1148 that are sized, oriented and positioned at or slightly inside the moving edges of belt 1114 to minimize the amount of sand spilled over the edges of moving belt 1114. In some embodiments, a weight-measuring sensor system 1154 measures and reports to computer system 160 the rate and amount of sand moved (in some embodiments, this rate of sand moved (e.g., tons per minute or hour) is integrated with the amount of time to yield the tons moved each minute or each hour), and the rate and amounts are recorded and reported using computer system 160. A gain, the cross-section of funnel hopper 1135 is shaded to more clearly indicate its location and shape. In some embodiments, the sloped bottom shape of funnel hopper 1135, which has rubber or rubber-like polymer bottom edges that may touch and rub against conveyor belt 1114, is configured to be as close as reasonable to the moving belt 1114 without scraping the belt, to prevent spilling sand to the sides or bottom end, which allows funnel hopper 1135 to be quickly filled with unloaded sand from the bottom-unloader dump truck 90 and at the same time dispense sand onto conveyor belt 1114 at user-specified rates of up to at least 800 tons per hour (which is equal to the sand from thirty-two (32) bottom-unloader dump trucks 90, each carrying twenty-five (25) tons of sand, and which, in some embodiments, is the limiting rate set by the rated capacity of the second conveyor 80 (see FIG. 2A and FIG. 2B)). In other embodiments, by configuring a wider conveyor belt (e.g., 50 or 60 inches wide), a correspondingly wider frame, and a more powerful motor (e.g., at least 80 to 100 horsepower (HP)) for first conveyor 111, system 100 can unload twenty-five (25) tons of sand each minute (wherein unloading 60 trucks per hour, each unloading twenty-five (25) tons of sand, gives the system 100 (with wider belts and more powerful electrical motors) an unloading, conveying and stacking rate of up to at least 1,500 tons per hour).

Thus, one key feature of the present invention is the shape and size of funnel hopper 1135, with its sloped bottom exit area with bottom edges 1148 that are made of a durable rubber or rubber-like polymer, and that have sloped belt-conforming sides and a belt-conforming lower end that has a convex shape to conform to the concave cross-section shape of the conveyor belt 1114, and sand-height-determining gate 1140 at the upper sand-exit end 1149 of funnel hopper 1135 having a height above belt 1114 that is adjustable using manually controlled or automatically controlled by actuator 1139 to control the rate at which sand is dispensed onto conveyor belt 1114. In some embodiments, funnel hopper 1135 has a top-end entrance size that is about 11 feet (3.33 meters) long and about 6.33 feet (about 1.93 meters) wide, which is an area of about 69.19 square feet (about 6.43 square meters), and a bottom width of about four feet (across the width of the conveyor belt, which is about four feet wide), and a bottom length of about 10.09 feet (about 3.07 meters), which has a bottom area of about 40.35 square feet (about 3.75 square meters). Thus, the rate at which sand passes through funnel hopper 1135 is determined by the width of conveyor belt 1114 (about 4 feet wide), the height of sand on conveyor belt 1114 as determined by the height of funnel-exit sand-height gate 1140, also called a "doctor blade" 1140, (which is adjustable up-and-down to achieve a desired height of sand on conveyor belt 1114), the concave cross-sectional shape of conveyor belt 1114, and the speed of conveyor belt 1114. In some embodiments, funnel hopper 1135 includes adjustable-height and/or adjustable-angle bottom edge pieces 1148 that each include at least a bottom portion made of rubber or a rubber-like polymer (in some embodiments, the rubber or rubber-like portion of edges 1148 is three (3) inches to six (6) inches (7.6 cm to 15.2 cm) wide, and in some preferred embodiments four (4) inches, in vertical height), wherein the rubber or rubber-like portion of edges 1148 has a softer durometer than the material of the conveyor belt 1114 so that when the edges 1148 are positioned in their operational configuration, these bottom edges 1148 of the funnel 1135 rub against belt 1114, wherein the bottom edges are adjustable in terms of their distances from conveyor belt 1114 (in some embodiments, the vertical positions and angle of the edges of funnel 1135 are adjusted so that bottom edges 1148 are touching and slightly pressing against belt 1114 (e.g., in some embodiments, the height adjustment is by nuts and bolts or other suitable clamping fixtures, which bolts are tightened at variable positions in slots located in the sheet metal of the funnel-hopper and/or in the movable edge portions 1148). Due to the rubber or rubber-like portion of edges 1148 having a softer durometer than conveyor belt 1114, they eventually wear out and are replaced as needed, thus avoiding wearing out conveyor belt 1114, which is usually more expensive.

Figure 4D:
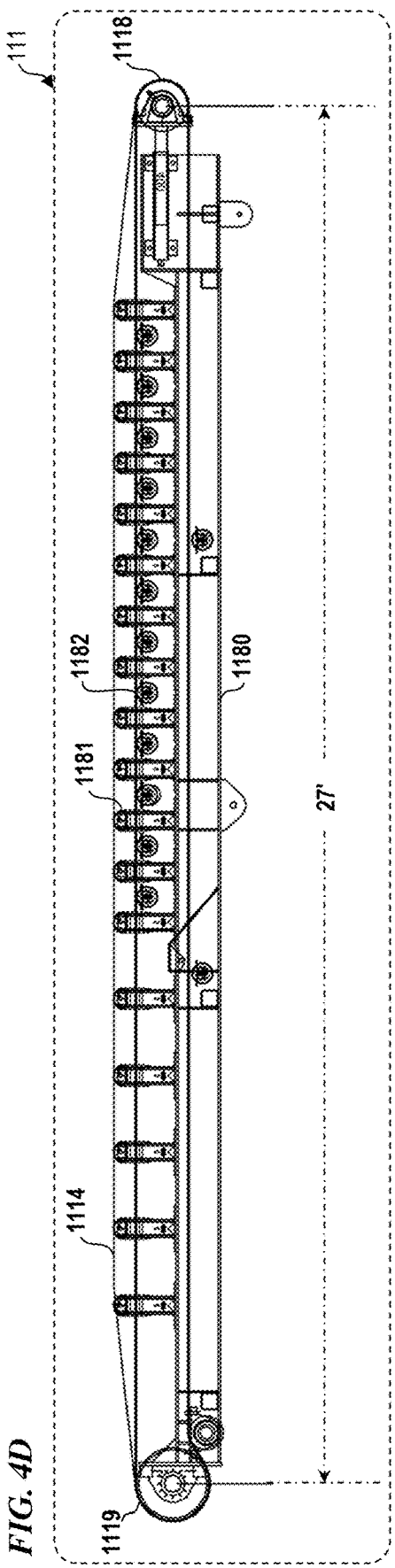
FIG. 4D is a side view of conveyor 111, according to some embodiments of the present invention.

FIG. 4D is a side view of conveyor 111, according to some embodiments of the present invention.

Figure 4E:
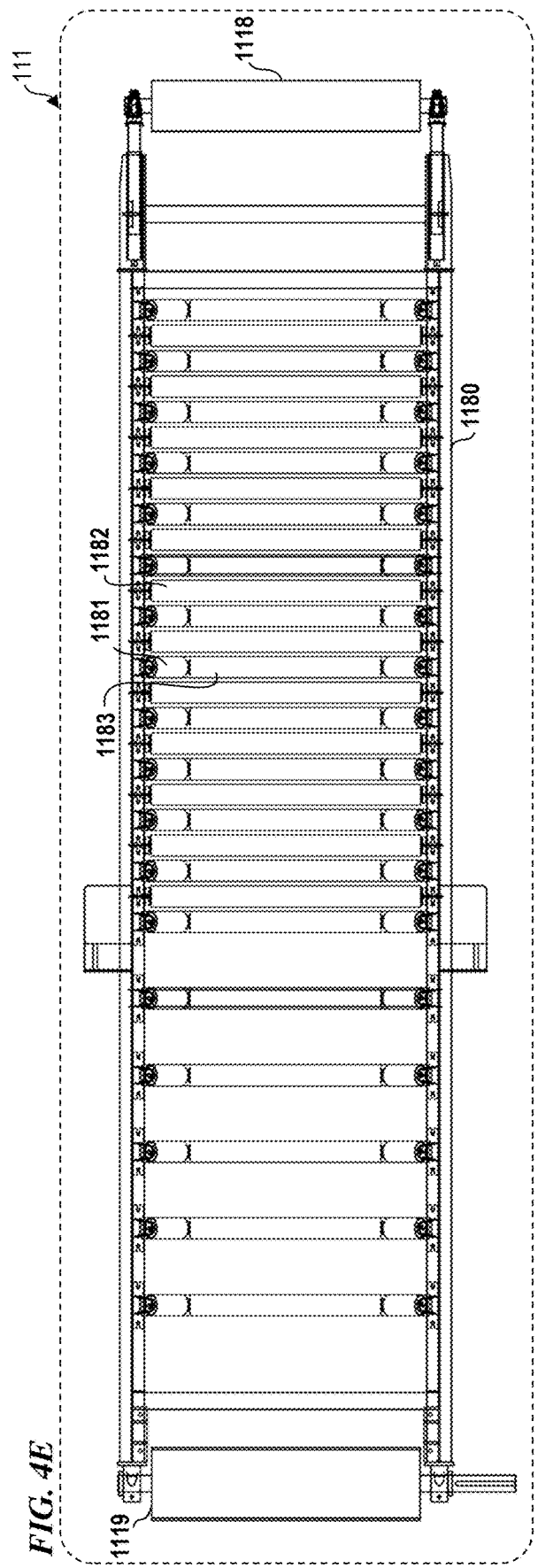
FIG. 4E is a top (plan) view of conveyor 111, according to some embodiments of the present invention.

FIG. 4E is a top (plan) view of conveyor 111, according to some embodiments of the present invention. For both FIG. 4D and FIG. 4E, in some embodiments, conveyor 111 includes a frame 1180, a belt 1114 that passes around lower-end roller 1118 and upper-end roller 1119 and then back again, and the upper path of belt 1114 is supported to form a concave top surface by a plurality of flat-bottom rollers 1182 that are positioned just under funnel hopper 1135 (see FIG. 4C), and a plurality of angled side rollers 1181 on both sides of shorter flat-bottom rollers 1183.

FIG. 4F1 is a top (plan) view of trailer-integrated drive-over center section 110 of sand-truck unloader system 100 in its highway-travel leveled configuration, before its first conveyor 111 has been rotated around rotational axis 1116 to its perpendicular operational configuration, according to some embodiments of the present invention.

FIG. 4F2 is a top (plan) view of an alternative foot 1100.2' used in place of the back-end foot 1100.2 in some embodiments of the center section sand-truck unloader system 100. In some embodiments, the end portions of foot 1100.2' are narrowed somewhat (e.g., three inches narrower on each side) to provide improved clearance for the foot 1100.2' between tires 1107 of the trailer of center section 110, between which the ends of leveling foot 1100.2' pass as it is lowered or raised.

FIG. 4G is a top (plan) view of trailer-integrated center section 110 of sand-truck unloader system 100 in its leveled configuration, after its first conveyor 111 has been rotated around rotational axis 1116 to its left-side perpendicular operational configuration, according to some embodiments of the present invention.

Figure 4I:
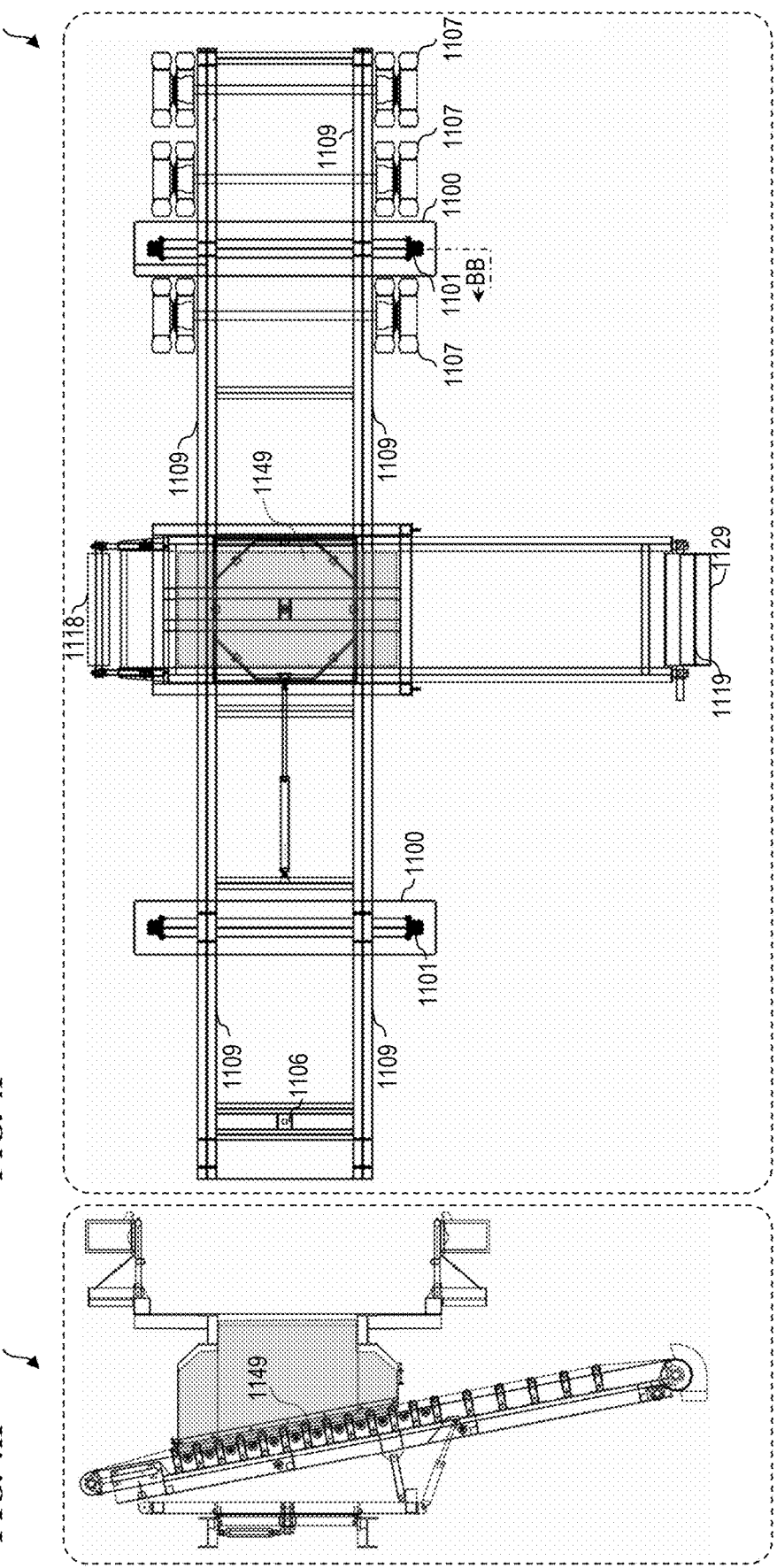
FIG. 4I is a cross-section elevation view (similar to FIG. 4G but scaled smaller, so that the shaded funnel hopper shape can be compared more easily to FIG. 4H) of trailer-integrated drive-over sand-truck unloader system 100 in the erected operational configuration in the operational configuration, according to some embodiments of the present invention.
Figure 4H:
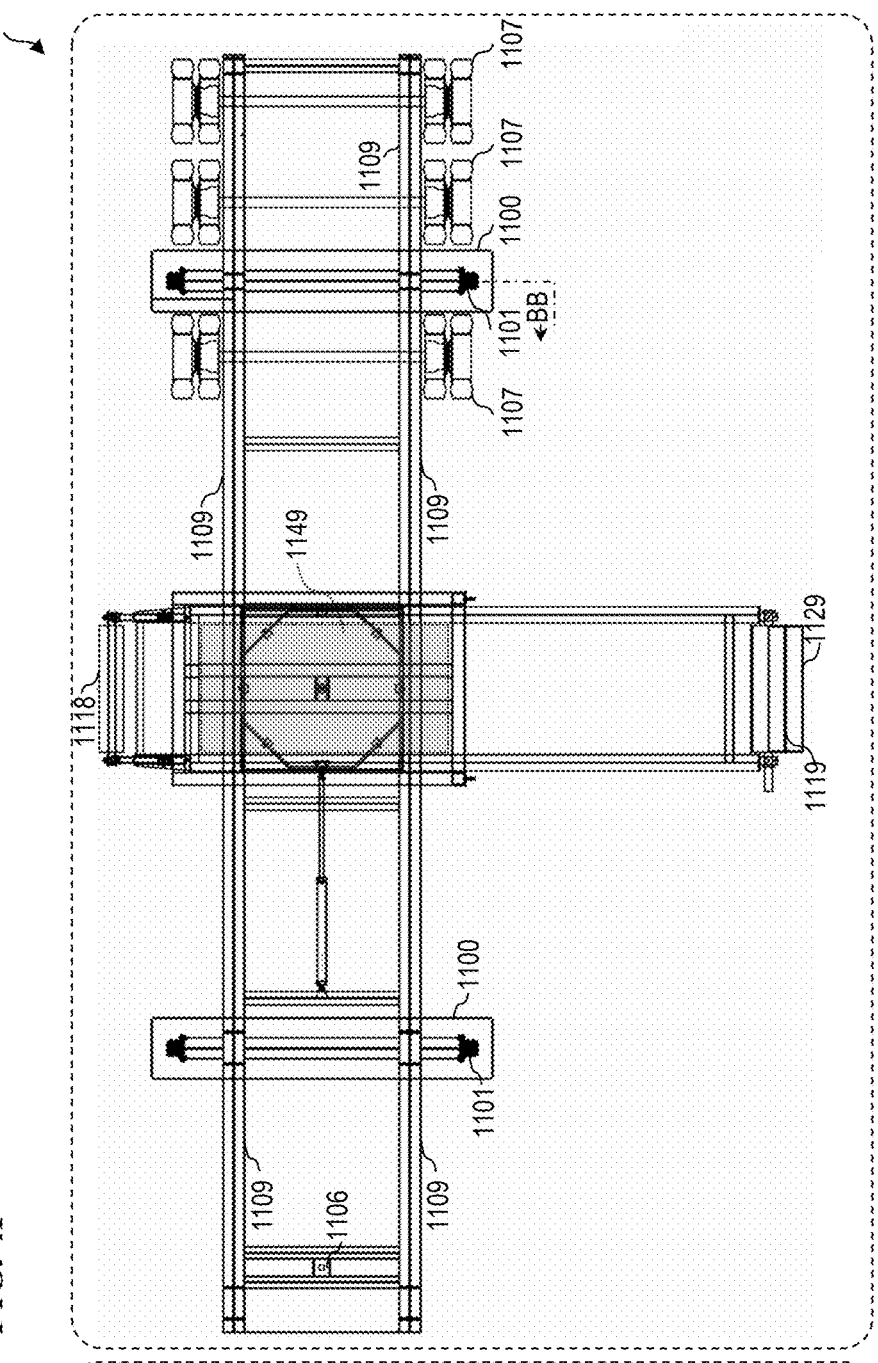
FIG. 4H is a cross-section elevation view (similar to FIG. 4C but rotated) of trailer-integrated drive-over sand-truck unloader system 100 in the erected operational configuration in the operational configuration, according to some embodiments of the present invention.

FIG. 4H is a cross-section elevation view (similar to FIG. 4C but rotated) of trailer-integrated drive-over sand-truck unloader system 100 in the erected operational configuration, according to some embodiments of the present invention.

FIG. 4I is a cross-section elevation view (similar to FIG. 4G but scaled smaller, so that the shaded funnel hopper shape can be compared more easily to FIG. 4H) of trailer-integrated drive-over sand-truck unloader system 100 in the erected operational configuration, according to some embodiments of the present invention.

In some embodiments, the present invention provides an integrated self-powered drive-over sand-truck unloading and conveyor system 100 configurable between an operational state and a compact highway-travel state. System 100 includes: a central drive-over conveyor section 110 integrated on a first trailer suitable for highway travel wherein the central drive-over conveyor section includes an elevated-level arched truck-support surface that is at least two meters above ground level and one or more elevated-level arched walkways beside the truck-support surface, a funnel hopper positioned at least mostly below the truck-support surface, an electrical generator set and a first conveyor configured for receiving bottom-unloaded sand from a bottom-dump sand truck and depositing the sand onto the first conveyor, wherein the first conveyor is powered directly or indirectly by electrical power from the electrical generator set, wherein the first conveyor is configured to rotate around a rotational axis of the first conveyor such that, when in the operational state, a distal end of the first conveyor is pointed to a side of the central drive-over conveyor section and angled further upward than when in the compact highway-travel state, and wherein the funnel hopper has a lower end that has two sides that are angled upward to match the angled-upward orientation of the first conveyor in its operational position; a drive-on ramp section 120.1 integrated on a second trailer suitable for highway travel, wherein the drive-on ramp section is removably connectable to the central drive-over conveyor section; and a drive-off ramp section 120.2 integrated on a third trailer suitable for highway travel, wherein the drive-off ramp section is removably connectable to the central drive-over conveyor section.

In some embodiments, the present invention provides an integrated self-powered drive-over sand-truck unloading and conveyor system 100 configurable between an operational state and a compact highway-travel state. In some embodiments, system 100 includes: a central drive-over conveyor section integrated on a first trailer suitable for highway travel wherein the central drive-over conveyor section includes an elevated-level arched truck-support surface that is at least two meters above ground level, a funnel hopper positioned at least mostly below the truck-support surface, and a first conveyor configured for receiving bottom-unloaded sand from a bottom-dump sand truck and depositing the sand onto the first conveyor, wherein the first conveyor is configured to rotate around a rotational axis of the first conveyor such that a distal end of the first conveyor is pointed to a side of the central drive-over conveyor section and angled upward, and wherein the funnel hopper has a lower end that has two sides that are angled upward to match the angled-upward orientation of the first conveyor in its operational position; a drive-on ramp section integrated on a second trailer suitable for highway travel, wherein the drive-on ramp section is removably connectable to the central drive-over conveyor section; a drive-off ramp section integrated on a third trailer suitable for highway travel, wherein the drive-off ramp section is removably connectable to the central drive-over conveyor section, and an electrical generator set mounted on one or more of the first, second, or third trailer, wherein the first conveyor is powered directly or indirectly by electrical power from the electrical generator set. In some such embodiments of system 100, the central drive-over conveyor section includes one or more elevated-level arched walkways beside the truck-support surface, wherein the trailer-integrated drive-on and drive-off ramp sections each has a ramped truck-support surface and one or more ramped walkways beside the ramped truck-support surface and each has hinged end ramps that fold over an adjacent portion of the trailer-integrated drive-on and drive-off ramp sections when in the highway-travel state and fold down to terminate at a ground level when in the operational state, and wherein the one or more ramped walkways of at least one of the drive-on ramp section and the drive-off ramp section extend from ground level to the elevated level of the center section (the central drive-over conveyor section) with handrails along at least a portion of the walkways.

In some embodiments of system 100, the trailer-integrated drive-on and drive-off ramp sections each has a ramped truck-support surface and one or more ramped walkways beside the ramped truck-support surface and each has a hinged end ramp that folds over an adjacent portion of the trailer-integrated drive-on and drive-off ramp sections when in the highway-travel state and folds down to terminate at a ground level when in the operational state, wherein the one or more ramped walkways extend from ground level to the elevated level of the center section with handrails along an entire length of the walkways.

In some embodiments of system 100, the trailer-integrated drive-on and drive-off ramp sections each has a ramped truck-support surface and one or more ramped walkways beside the ramped truck-support surface, wherein, when in the operational state, the one or more ramped walkways extend from ground level to the elevated level of the center section with handrails along an entire length of the walkways.

In some embodiments of system 100, the funnel hopper holds at least five cubic meters of sand at one time.

In some embodiments of system 100, the funnel hopper holds at least seven cubic meters of sand at one time.

In some embodiments of system 100, the funnel hopper holds at least ten cubic meters of sand at one time.

In some embodiments of system 100, the funnel hopper includes adjustable-height bottom edge pieces that each includes at least a bottom portion made of rubber or a rubber-like polymer, wherein the rubber or rubber-like portion of the adjustable-height bottom edge pieces has a softer durometer than the material of the conveyor belt, and wherein the height of the adjustable-height bottom edge pieces is adjusted such that the adjustable-height bottom edge pieces press and rub against the first conveyor belt during operation of the system.

Some embodiments (e.g., system 200) further include a radial stacker built onto a fourth trailer suitable for highway travel, wherein the radial stacker includes a second conveyor powered by electrical power from the electrical generator set, wherein the radial stacker includes a plurality of wheels powered by electrical power from the electrical generator set, wherein the plurality of wheels move the radial stacker such that a distal end of the second conveyor moves along a horizontal arc to distribute sand onto an arc-shaped sand pile.

Some embodiments of system 100 or system 200 further include a conventional enclosed office structure 410 built onto a fifth trailer 400, wherein the office structure 410 includes equipment powered by electrical power from the electrical generator set to provide logistical support to workers operating the system when in the system is in its operational configuration.

In some embodiments of system 100, the first trailer 110 further includes: an input funnel hopper configured for receiving bottom-unloaded sand from a bottom-dump sand truck and depositing the sand onto the first conveyor, wherein the first conveyor is configured to deposit sand from a distal end of the first conveyor onto a proximal end of the second conveyor. In some such embodiments, the input funnel hopper includes adjustable-height and adjustable-angle bottom edges to conform to locations and angles of edges of the first conveyor to control discharge of sand to the first conveyor.

In some embodiments of system 100, the trailer-integrated drive-on and drive-off ramp sections have ends at ground level when in their operational configuration.

In some embodiments of system 100, the trailer-integrated drive-on and drive-off ramp sections and the central drive-over conveyor section include conduit-enclosed wiring.

In some embodiments of system 100, the trailer-integrated drive-on and drive-off ramp sections and the central drive-over conveyor section include safety illumination lighting.

In some embodiments of system 100, the trailer-integrated drive-on and drive-off ramp sections and the central drive-over conveyor section each include a front-end leveling-support foot and a back-end leveling-support foot, wherein each leveling-support foot is at least 2-feet wide and at least 12-feet long, and wherein two ends of each leveling-support foot are lowered and raised using hydraulic cylinders.

In some embodiments of system 100, the electrical generator set includes a primary generator and a backup generator, wherein the primary generator and the backup generator are mounted onto one or more of the trailers.

Some embodiments of system 100 further include: a plurality of manually controlled elevation actuators configured for erection of the system by a person located at ground level; and a plurality of height-maintenance locks, wherein the elevation actuators and height-maintenance locks eliminate a need for workers to climb onto system 100 and use safety harnesses.

Some embodiments of system 100 further include: a plurality of electrically controlled automated elevation actuators configured for erection of the system by a person located at ground level; and a plurality of height-maintenance locks, wherein the elevation actuators and height-maintenance locks eliminate a need for workers to climb onto system 100 and use safety harnesses.

In some embodiments, system 100 unloads, conveys, and radially stacks at least seven-hundred (700) tons of sand per hour.

In some embodiments, system 100 unloads, conveys, and radially stacks any user-specified variable amount of up to at least eight-hundred (800) tons of sand per hour.

In some embodiments, system 100 unloads, conveys, and radially stacks at least two-hundred (200) tons of sand per hour.

In some embodiments, system 100 unloads, conveys, and radially stacks at least four-hundred (400) tons of sand per hour.

In some embodiments, system 100 unloads, conveys, and radially stacks at least six-hundred (600) tons of sand per hour.

In some embodiments, the present invention provides a central drive-over conveyor system 110 integrated on a first trailer suitable for highway travel. This central drive-over conveyor system 110 includes: an elevated-level arched truck-support surface that is at least two meters above ground level, a first conveyor that is configured to rotate around a rotational axis of the first conveyor from a first position, used for the highway-travel state, that has a distal end of the first conveyor inside a frame of the first trailer, to a second position, used for the operational state, that has the distal end of the first conveyor pointed to a side of the central drive-over conveyor section and angled further upward than when in the highway-travel state, a funnel hopper positioned at least mostly below the truck-support surface, and configured for receiving bottom-unloaded sand from a bottom-dump sand truck and depositing the sand onto the first conveyor, wherein the funnel hopper has a lower end that has two sides that are angled upward to match the angled-upward orientation of the first conveyor in its operational position, and an electrical generator set mounted on the first trailer and configured to supply power to the first conveyor.

Some embodiments of the drive-over conveyor system 110 further include a drive-on ramp section 120.1 integrated on a second trailer suitable for highway travel, wherein the drive-on ramp section 120.1 is removably connectable to the central drive-over conveyor section and is configured to receive, from the first trailer, at least one of electrical power and hydraulic power; and a drive-off ramp section 120.2 integrated on a third trailer suitable for highway travel, wherein the drive-off ramp section is removably connectable to the central drive-over conveyor section and is configured to receive, from the first trailer, at least one of electrical power and hydraulic power.

In some embodiments, the present invention provides a drive-over sand-truck-unloading-and-conveyor method that includes: providing a self-contained trailer system operable to be set up into an erected operational configuration and to be reconfigured into a more-compact highway-travel configuration, wherein the trailer system includes: a first trailer suitable for highway travel, wherein on the first trailer are mounted and pre-assembled: an elevated-level arched truck-support surface that is at least two meters above ground level, a first conveyor that is configured to rotate around a rotational axis of the first conveyor from a first position, used for the highway-travel state, that has a distal end of the first conveyor inside a frame of the first trailer, to a second position, used for the operational state, that has the distal end of the first conveyor is pointed a side of the central drive-over conveyor section and angled further upward than when in the highway-travel state, and a funnel hopper positioned at least mostly below the truck-support surface, and configured for receiving bottom-unloaded sand from a bottom-dump sand truck and depositing the sand onto the first conveyor, wherein the funnel hopper has a lower end that has two sides that are angled upward to match the angled-upward orientation of the first conveyor; a drive-on ramp section integrated on a second trailer suitable for highway travel, wherein the drive-on ramp section is removably connectable to the central drive-over conveyor section; a drive-off ramp section integrated on a third trailer suitable for highway travel, wherein the drive-off ramp section is removably connectable to the central drive-over conveyor section, and an electrical generator set mounted on one or more of the first, second, or third trailer, wherein the first conveyor is powered directly or indirectly by electrical power from the electrical generator set, wherein the first, second and third trailer each include a plurality of support-foot-elevation actuators each coupled to a respective support foot of the respective trailer, lowering a first support foot and a second support foot of the first trailer onto a ground level under the first trailer; connecting the second trailer to the first trailer; supplying, from the first trailer to the second trailer, at least one of electrical power and hydraulic power; lowering a first support foot and a second support foot of the second trailer onto a ground level under the second trailer using power supplied from the first trailer; connecting the third trailer to the first trailer; supplying, from the first trailer to the third trailer, at least one of electrical power and hydraulic power; lowering a first support foot and a second support foot of the third trailer onto a ground level under the third trailer using power supplied from the first trailer; rotating the first conveyor around its rotational axis such that a distal end of the first conveyor is pointed a side of the central drive-over conveyor section and angled further upward than when in the more-compact highway-travel configuration; elevating an end of the first conveyor to an operational angle using one or more of a plurality of elevation actuators; and using the first conveyor to convey sand from the funnel hopper to a second conveyor.

Some embodiments of the method further include providing a radial stacker built onto a fourth trailer suitable for highway travel, wherein the radial stacked includes the second conveyor; and using the second conveyor to convey its sand to a higher elevation and drop the sand into the radial arc.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. An integrated self-powered drive-over sand-truck unloading and conveyor system configurable between an operational state and a compact highway-travel state, the system comprising:
   a central drive-over conveyor section integrated on a first trailer configurable for highway travel wherein the central drive-over conveyor section includes:
      an elevated-level arched truck-support surface that is at least two meters above ground level,
      a first conveyor that is configured to rotate around a rotational axis of the first conveyor from a first position, used for the highway-travel state, that has a distal end of the first conveyor inside a frame of the first trailer, to a second position, used for the operational state, that has the distal end of the first conveyor pointed to a side of the central drive-over conveyor section and angled further upward than when in the highway-travel state, and
      a funnel hopper positioned at least mostly below the truck-support surface, and configured for receiving bottom-unloaded sand from a bottom-dump sand truck and depositing the sand onto the first conveyor, wherein the funnel hopper has a lower end that has two sides that are angled upward to match the angled-upward orientation of the first conveyor in its operational position;
   a drive-on ramp section integrated on a second trailer suitable for highway travel, wherein the drive-on ramp section is removably connectable to the central drive-over conveyor section;
   a drive-off ramp section integrated on a third trailer suitable for highway travel, wherein the drive-off ramp section is removably connectable to the central drive-over conveyor section; and
   an electrical generator set mounted on one or more of the first, second, or third trailer, wherein the first conveyor is powered directly or indirectly by electrical power from the electrical generator set.

2. The system of claim 1, wherein the central drive-over conveyor section includes one or more elevated-level arched walkways beside the truck-support surface, wherein the trailer-integrated drive-on and drive-off ramp sections each has a ramped truck-support surface and one or more ramped walkways beside the ramped truck-support surface and each has hinged end ramps that fold over an adjacent portion of the trailer-integrated drive-on and drive-off ramp sections when in the highway-travel state and fold down to terminate at a ground level when in the operational state, and wherein the one or more ramped walkways of at least one of the drive-on ramp section and the drive-off ramp section extend from ground level to the elevated level of the central drive-over conveyor section with handrails along at least a portion of the walkways, and wherein at least some of the handrails are configured to be placed in a lowered position for the compact highway-travel state, and configured to be placed in a raised locked position for the operational state.

3. The system of claim 1, wherein the trailer-integrated drive-on and drive-off ramp sections each has a ramped truck-support surface and one or more ramped walkways beside the ramped truck-support surface, wherein, when in the operational state, the one or more ramped walkways extend from ground level to the elevated level of the central drive-over conveyor section with handrails along an entire length of the walkways.

4. The system of claim 1, wherein the funnel hopper holds at least five cubic meters of sand at one time.

5. The system of claim 1, wherein the funnel hopper includes adjustable-height bottom edge pieces that each include at least a bottom portion made of rubber or a polymer, wherein the rubber or polymer portion of the adjustable-height bottom edge pieces has a softer durometer than the material of the conveyor belt, and wherein the height of the adjustable-height bottom edge pieces is adjusted such that the adjustable-height bottom edge pieces press and rub against the first conveyor belt during operation of the system.

6. The system of claim 1, further comprising a radial stacker built onto a fourth trailer suitable for highway travel, wherein the radial stacker includes a second conveyor powered by electrical power from the electrical generator set, wherein the radial stacker includes a plurality of wheels powered by electrical power from the electrical generator set, wherein the plurality of wheels move the radial stacker such that a distal end of the second conveyor moves along a horizontal arc to distribute sand onto an arc-shaped sand pile.

7. The system of claim 1, further comprising a radial stacker built onto a fourth trailer suitable for highway travel, wherein the radial stacker includes a second conveyor powered by electrical power from the electrical generator set, wherein the radial stacker includes a plurality of wheels powered by electrical power from the electrical generator set, wherein the plurality of wheels move the radial stacker such that a distal end of the second conveyor moves along a horizontal arc to distribute sand onto an arc-shaped sand pile, and wherein the funnel hopper is configured for receiving bottom-unloaded sand from a bottom-dump sand truck and depositing the sand onto the first conveyor, wherein the first conveyor is configured to deposit sand from a distal end of the first conveyor onto a proximal end of the second conveyor.

8. The system of claim 1, wherein the funnel hopper includes adjustable-height and adjustable-angle bottom edges to conform to locations and angles of edges of the first conveyor to control discharge of sand to the first conveyor.

9. The system of claim 1, further comprising a conventional enclosed office structure built onto an office-structure trailer, the office structure including equipment powered by electrical power from the electrical generator set to provide logistical support to workers operating the system when in the system is in its operational configuration.

10. The system of claim 1, wherein, when in their operational configuration, the trailer-integrated drive-on ramp section has a truck-drive-on end that is at ground level and the drive-off ramp section has a truck-drive-off end at ground level.

11. The system of claim 1, wherein the trailer-integrated drive-on and drive-off ramp sections and the central drive-over conveyor section include conduit-enclosed wiring.

12. The system of claim 1, wherein the trailer-integrated drive-on and drive-off ramp sections and the central drive-over conveyor section include safety illumination lighting.

13. The system of claim 1, wherein the trailer-integrated drive-on and drive-off ramp sections and the central drive-over conveyor section each includes a front-end leveling-support foot and a back-end leveling-support foot, wherein each leveling-support foot is at least two-feet wide and at least twelve-feet long, and wherein each leveling-support foot is lowered and raised using hydraulic cylinders.

14. The system of claim 1, wherein the electrical generator set includes a primary generator and a backup generator, wherein the primary generator and the backup generator are mounted onto one or more of the trailers.

15. The system of claim 1, further comprising:
a plurality of manually controlled elevation actuators configured for erection of the system by a person located at ground level; and
a plurality of height-maintenance locks, wherein the elevation actuators and height-maintenance locks eliminate a need for workers to use safety harnesses.

16. The system of claim 1, further comprising:
a plurality of electrically controlled automated elevation actuators configured for erection of the system by a person located at ground level; and
a plurality of height-maintenance locks, wherein the elevation actuators and height-maintenance locks eliminate a need for workers to use safety harnesses.

17. The system of claim 1, wherein the drive-over sand-truck unloader and conveyor system unloads, conveys, and radially stacks at least 700 tons of sand per hour.

18. The system of claim 1, wherein the drive-over sand-truck unloader and conveyor system unloads, conveys, and radially stacks any user-specified variable rate of sand of up to at least 800 tons of sand per hour.

19. An integrated self-powered drive-over sand-truck unloading and conveyor system configurable between an operational state and a compact highway-travel state, the system comprising:
a central drive-over conveyor section integrated on a first trailer suitable for highway travel wherein the central drive-over conveyor section includes:
an elevated-level arched truck-support surface that is at least two meters above ground level,
a first conveyor that is configured to rotate around a rotational axis of the first conveyor from a first position, used for the highway-travel state, that has a distal end of the first conveyor inside a frame of the first trailer, to a second position, used for the operational state, that has the distal end of the first conveyor pointed to a side of the central drive-over conveyor section and angled further upward than when in the highway-travel state,
a funnel hopper positioned at least mostly below the truck-support surface, and configured for receiving bottom-unloaded sand from a bottom-dump sand truck and depositing the sand onto the first conveyor, wherein the funnel hopper has a lower end that has two sides that are angled upward to match the angled-upward orientation of the first conveyor in its operational position, and
an electrical generator set mounted on the first trailer and configured to supply power to the first conveyor.

20. The apparatus of claim 19, wherein the two sides of the funnel hopper each have a bottom edge, wherein a vertical position and angle of the bottom edges are adjustable to match the angled-upward orientation of the first conveyor in its operational position, such that the bottom edges of the two sides of the funnel hopper touch and rub against the conveyor when in the operational state.

21. The apparatus of claim 19, wherein the funnel hopper has an internal volume that holds at least 13.5 cubic yards of sand at one time.

22. The apparatus of claim 19, wherein the funnel hopper includes a funnel-exit sand-height gate that is adjustable up-and-down to achieve a desired height of sand on the conveyor.

23. An integrated self-powered drive-over sand-truck unloading and conveyor system configurable between an operational state and a compact highway-travel state, the system comprising:
a central drive-over conveyor section integrated on a first trailer suitable for highway travel wherein the central drive-over conveyor section includes:
an elevated-level arched truck-support surface that is at least two meters above ground level,
a first conveyor that is configured to rotate around a rotational axis of the first conveyor from a first position, used for the highway-travel state, that has a distal end of the first conveyor inside a frame of the first trailer, to a second position, used for the operational state, that has the distal end of the first conveyor pointed to a side of the central drive-over conveyor section and angled further upward than when in the highway-travel state,
a funnel hopper positioned at least mostly below the truck-support surface, and configured for receiving bottom-unloaded sand from a bottom-dump sand truck and depositing the sand onto the first conveyor, wherein the funnel hopper has a lower end that has two sides that are angled upward to match the angled-upward orientation of the first conveyor in its operational position, and
an electrical generator set mounted on the first trailer and configured to supply power to the first conveyor; and
a drive-on ramp section integrated on a second trailer suitable for highway travel, wherein the drive-on ramp section is removably connectable to the central drive-over conveyor section and configured to receive, from the first trailer, at least one of electrical power and hydraulic power; and
a drive-off ramp section integrated on a third trailer suitable for highway travel, wherein the drive-off ramp section is removably connectable to the central drive-over conveyor section and configured to receive, from the first trailer, at least one of electrical power and hydraulic power.

24. A drive-over sand-truck-unloading-and-conveyor method comprising:
providing a self-contained trailer system operable to be set up into an erected operational configuration and to be reconfigured into a more-compact highway-travel configuration, wherein the trailer system includes
a first trailer suitable for highway travel, wherein on the first trailer are mounted and pre-assembled: an elevated-level arched truck-support surface that is at least two meters above ground level, a first conveyor that is configured to rotate around a rotational axis of the first conveyor from a first position, used for the highway-travel state, that has a distal end of the first conveyor inside a frame of the first trailer, to a second position, used for the operational state, that has the distal end of the first conveyor pointed to a side of the central drive-over conveyor section and angled further upward than when in the highway-travel state, and a funnel hopper positioned at least mostly below the truck-support surface, and configured for receiving bottom-unloaded sand from a bottom-dump sand truck and depositing the sand onto the first conveyor, wherein the funnel hopper has a lower end that has two sides that are angled upward to match the angled-upward orientation of the first conveyor in its operational position;

a drive-on ramp section integrated on a second trailer suitable for highway travel, wherein the drive-on ramp section is removably connectable to the central drive-over conveyor section;

a drive-off ramp section integrated on a third trailer suitable for highway travel, wherein the drive-off ramp section is removably connectable to the central drive-over conveyor section, and an electrical generator set mounted on one or more of the first, second, or third trailers, wherein the first conveyor is powered directly or indirectly by electrical power from the electrical generator set, wherein the first, second and third trailer each include a plurality of support-foot-elevation actuators, each coupled to a respective support foot of the respective trailer, lowering a first support foot and a second support foot of the first trailer onto a ground level under the first trailer;

connecting the second trailer to the first trailer;

supplying, from the first trailer to the second trailer, at least one of electrical power and hydraulic power;

lowering a first support foot and a second support foot of the second trailer onto a ground level under the second trailer using power supplied from the first trailer;

connecting the third trailer to the first trailer;

supplying, from the first trailer to the third trailer, at least one of electrical power and hydraulic power;

lowering a first support foot and a second support foot of the third trailer onto a ground level under the third trailer using power supplied from the first trailer;

rotating the first conveyor around its rotational axis such that a distal end of the first conveyor is pointed to a side of the central drive-over conveyor section and angled further upward than when in the more-compact highway-travel configuration;

elevating an end of the first conveyor to an operational angle using one or more of a plurality of elevation actuators; and using the first conveyor to convey sand from the funnel hopper to a second conveyor.

25. The method of claim 24, further comprising:

providing a radial stacker built onto a fourth trailer suitable for highway travel, wherein the radial stacked includes the second conveyor; and using the second conveyor to convey its sand to a higher elevation and drop the sand into a radial arc.

26. A drive-over sand-truck-unloading-and-conveyor apparatus comprising:

a self-contained trailer system operable to be set up into an erected operational configuration and to be reconfigured into a more-compact highway-travel configuration, wherein the trailer system includes a first trailer suitable for highway travel, wherein on the first trailer are mounted and pre-assembled: an elevated-level arched truck-support surface that is at least two meters above ground level, a first conveyor that is configured to rotate around a rotational axis of the first conveyor from a first position, used for the highway-travel state, that has a distal end of the first conveyor inside a frame of the first trailer, to a second position, used for the operational state, that has the distal end of the first conveyor pointed to a side of the central drive-over conveyor section and angled further upward than when in the highway-travel state, and a funnel hopper positioned at least mostly below the truck-support surface, and configured for receiving bottom-unloaded sand from a bottom-dump sand truck and depositing the sand onto the first conveyor, wherein the funnel hopper has a lower end that has two sides that are angled upward to match the angled-upward orientation of the first conveyor in its operational position;

a drive-on ramp section integrated on a second trailer suitable for highway travel, wherein the drive-on ramp section is removably connectable to the central drive-over conveyor section;

a drive-off ramp section integrated on a third trailer suitable for highway travel, wherein the drive-off ramp section is removably connectable to the central drive-over conveyor section, and an electrical generator set mounted on one or more of the first, second, or third trailers, wherein the first conveyor is powered directly or indirectly by electrical power from the electrical generator set, wherein the first, second and third trailer each include a plurality of support-foot-elevation actuators, each coupled to a respective support foot of the respective trailer, means for lowering a first support foot and a second support foot of the first trailer onto a ground level under the first trailer;

means for connecting the second trailer to the first trailer;

means for supplying, from the first trailer to the second trailer, at least one of electrical power and hydraulic power;

means for lowering a first support foot and a second support foot of the second trailer onto a ground level under the second trailer using power supplied from the first trailer;

means for connecting the third trailer to the first trailer;

means for supplying, from the first trailer to the third trailer, at least one of electrical power and hydraulic power;

means for lowering a first support foot and a second support foot of the third trailer onto a ground level under the third trailer using power supplied from the first trailer;

means for rotating the first conveyor around its rotational axis such that a distal end of the first conveyor is pointed to a side of the central drive-over conveyor section and angled further upward than when in the more-compact highway-travel configuration;

means for elevating an end of the first conveyor to an operational angle using one or more of a plurality of elevation actuators; and means for using the first conveyor to convey sand from the funnel hopper to a second conveyor.

* * * * *